US012811069B2

(12) United States Patent
Randall et al.

(10) Patent No.: US 12,811,069 B2
(45) Date of Patent: Nov. 24, 2026

(54) ALUMINUM ELECTROLYTIC CAPACITOR FOR SEMICONDUCTOR DEVICE AND ARRAY PRODUCTION METHODS THEREOF

(71) Applicant: Saras Micro Devices, Inc., Chandler, AZ (US)

(72) Inventors: Michael Randall, Simpsonville, SC (US); Richard Sheridan, Gilbert, AZ (US); Ron Huemoeller, Gilbert, AZ (US)

(73) Assignee: Saras Micro Devices, Inc., Chandler, AZ (US)

( * ) Notice: Subject to any disclaimer, the term of this patent is extended or adjusted under 35 U.S.C. 154(b) by 266 days.

(21) Appl. No.: 18/935,054

(22) Filed: Nov. 1, 2024

(65) Prior Publication Data

US 2026/0128236 A1 May 7, 2026

(51) Int. Cl.
*H01G 9/028* (2006.01)
*H01G 9/00* (2006.01)
(Continued)

(52) U.S. Cl.
CPC ........... *H01G 9/028* (2013.01); *H01G 9/0036* (2013.01); *H01G 9/045* (2013.01); *H01G 9/15* (2013.01)

(58) Field of Classification Search
CPC .... H01G 9/0036; H01G 9/012; H01G 9/0425; H01G 9/045; H01G 9/044; H01G 9/15
See application file for complete search history.

(56) References Cited

U.S. PATENT DOCUMENTS

| | | | |
|---|---|---|---|
| 6,525,921 | B1 | 2/2003 | Nakatani |
| 10,658,111 | B2 | 5/2020 | Hattori |

(Continued)

FOREIGN PATENT DOCUMENTS

| | | | | |
|---|---|---|---|---|
| CN | 104282441 A | 1/2015 | | |
| CN | 110277246 A * | 9/2019 | ............. | H01G 9/055 |

(Continued)

OTHER PUBLICATIONS

JP-H1136054-A Machine Translation (Year: 1997).*
(Continued)

*Primary Examiner* — Nathan Milakovich
(74) *Attorney, Agent, or Firm* — Stetina Garred Brucker & Newboles

(57) ABSTRACT

The fabrication of conductive polymer aluminum dielectric capacitors proceeds with patterning an array of anode structures on a capacitor precursor laminate structure of a carrier and a metal layer adhered to the carrier. Substantially the entire thickness of the metal layer of each of the anode structures is etched, and an open accessible surface area of the metal layer is increased accordingly. The open accessible surface area of the anode structures is then anodized to form an oxide layer, thus defining anodes. Cathode counter-electrodes are established on each of the anodes. Input/output structures are attached to the anodes and to the cathode counter-electrodes. Given ones of the anodes, cathode counter-electrodes, and the input/output structures define a capacitor unit, and multiple ones of the capacitor unit may define a capacitor or a capacitor array.

20 Claims, 13 Drawing Sheets

(51) Int. Cl.
*H01G 9/045* (2006.01)
*H01G 9/15* (2006.01)

(56) References Cited

U.S. PATENT DOCUMENTS

| | | | | |
|---|---|---|---|---|
| 2002/0122283 | A1 | 9/2002 | Higashi | |
| 2003/0007311 | A1 | 1/2003 | Kojima | |
| 2006/0202346 | A1 | 9/2006 | Shih | |
| 2008/0216296 | A1 | 9/2008 | Prymak | |
| 2016/0329158 | A1 | 11/2016 | Hattori | |
| 2017/0018368 | A1* | 1/2017 | Ito | H01G 9/042 |
| 2018/0374843 | A1 | 12/2018 | Muri | |
| 2019/0080849 | A1 | 3/2019 | Fujii | |
| 2021/0082630 | A1* | 3/2021 | Furukawa | H01G 9/0029 |
| 2022/0278035 | A1 | 9/2022 | Otani | |
| 2023/0006788 | A1 | 1/2023 | Dai | |
| 2023/0067888 | A1 | 3/2023 | Sundaram | |
| 2024/0021372 | A1 | 1/2024 | Timms | |
| 2025/0079090 | A1* | 3/2025 | Habu | H01G 9/028 |

FOREIGN PATENT DOCUMENTS

| | | | | | |
|---|---|---|---|---|---|
| CN | 119905352 | A | * | 4/2025 | H01G 9/035 |
| JP | H1136054 | A | * | 2/1999 | |
| JP | 2005268681 | A | * | 9/2005 | |
| JP | 2007173439 | A | | 7/2007 | |
| JP | 2008078301 | A | | 4/2008 | |
| JP | 2009224555 | A | | 10/2009 | |
| WO | 2012042950 | A1 | | 4/2012 | |
| WO | WO-2015019987 | A1 | * | 2/2015 | C25D 11/06 |

OTHER PUBLICATIONS

JP-2005268681-A Machine Translation (Year: 2004).*
WO-2015019987-A1 (Year: 2014).*
CN-110277246-A Machine Translation (Year: 2019).*
CN-119905352-A Machine Translation (Year: 2024).*
Micromachines. “Focused Electron Beam-Based 3D Nanoprinting for Scanning Probe Microscopy: A Review;” Harold Plank et al.; http://www.mdpi.com/journal/micromachines, Date: 2020.

* cited by examiner

ALUMINUM ELECTROLYTIC CAPACITOR FOR SEMICONDUCTOR DEVICE AND ARRAY PRODUCTION METHODS THEREOF

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to passive electronic devices and capacitors specifically, as well as fabrication methods thereof. The present disclosure relates more particularly to aluminum electrolytic capacitor array production methods and capacitors resulting therefrom.

2. Related Art

Capacitors are an important part of many integrated and embedded circuits and are commonly used as energy storage structures, as primary components in filters and other signal conditioning applications, and as specific components of other types of complex integrated circuits. Capacitors are commonly arranged as a pair of opposing thin electrodes separated by a dielectric, with electrical energy being stored as a consequence of equal and opposite relative polarities on the opposing electrodes.

A wide variety of configurations of capacitors are known in the art. One configuration is the aluminum electrolytic capacitor that utilizes aluminum foil as the electrodes with a thin oxide layer thereon serving as the dielectric. A solid conductive polymer is utilized as the electrolyte. Such solid conductive polymer aluminum electrolytic capacitors exhibit numerous desirable properties such as low equivalent series resistance (ESR), resulting in high ripple current capability, long service life, low profile possible through compact packages with high capacitance per unit volume (C/Vol.), and cost reductions. Development efforts are focused on improvements in reducing ESR and maximizing C/Vol., while lowering prices. Improvements in this regard have been realized through evolving features, but revolutionary opportunities for improvements may be possible due to limitations inherent to the basic design of solid conductive polymer aluminum electrolytic capacitors.

In general, solid conductive polymer aluminum electrolytic capacitors are comprised of an aluminum foil anodized to form an aluminum oxide dielectric on the aluminum layer. This establishes the anode and the dielectric of the capacitor. The aluminum foil is typically etched to increase the surface area (A) prior to anodization, so that the active area per unit volume of the anodized film is also increased. The capacitance per unit volume C/Vol., which is given by:

$$\frac{\frac{(\varepsilon_0 \cdot \varepsilon_r \cdot A)}{t}}{Vol.}$$

where $\varepsilon_0$ is the dielectric permittivity of free space, or $8.854\times10^{-12}$ F/m, $\varepsilon_r$ is the relative dielectric constant, a.k.a, K (unitless), A is the active area of the dielectric that is under electric field, given in ($m^2$), and t is the distance between the conductors that apply the electric field, or the dielectric thickness, given in (m).

In order to further increase C/Vol. and to simplify production, both sides of the aluminum foil are typically etched and anodized. The etched and anodized foil is characterized by an active portion and an inactive portion, with the active portion/volume contributing to increase A while the inactive portion/volume does not. Thus, when maximizing C/Vol., the active portion should be maximized, while the inactive portion should be minimized.

The etched and anodized foil is typically cut into small sizes or leaflets, which are then aligned, stacked, and electrically/mechanically attached to an anode lead structure for further processing. This step is difficult and costly because the leaflets are prone to damage during the stacking and attachment steps. Furthermore, an additional anodization step of the stacked anode leaflets is necessary to establish or re-establish the oxide dielectric before proceeding to the next step of the manufacturing process (e.g., newly cut foil would need an initial anodization to establish the oxide dielectric, while damaged dielectric may need additional anodization).

The stacked foil structure of the conductive polymer aluminum electrolytic capacitor is generally comprised of a capacitor element portion and a packaging and lead structure portion, with the inactive portion making up a relatively high proportion of the overall device. Furthermore, even within the capacitor element portion, there is a relatively large inactive portion. Indeed, the total active portion of the conductive polymer aluminum electrolytic capacitor is minimal, accounting for less than ~5% of the overall volume. Accordingly, there is a need in the art to increase the active portion, so as to yield increases in the capacitance per unit volume (C/Vol.), and effectuate other capacitor performance parameter improvements such as equivalent series resistance (ESR).

BRIEF SUMMARY

The embodiments of the present disclosure are directed to the manufacturing of conductive polymer aluminum electrolytic capacitors by laminating aluminum foil or geometrically formed aluminum sheet or foil onto a carrier material. The lamination may be temporary or permanent. The carrier material may be a polyimide, biaxially oriented polypropylene (BOPP), or polyethylene terephthalate (PET), or a metallic sheet, or any suitable carrier film. The laminated aluminum sheet may be patterned with anode structures, then the open accessible surface area may be increased by etching and/or various other methods. The anode structures may then be anodized to deposit an oxide layer, then cathode counter electrodes in the form of conductive polymers may be applied thereto. Input/output structures may then be attached, and the resultant structures may be configured and assembled to achieve desired capacitor parameters. The structures may then be packaged to provide environmental isolation, and tested to ensure performance. There may be an additional packaging step for automated assembly, embedding within a circuit, or interposing within an integrated circuit package to operate as a capacitor within an electrical or electronic circuit. The carrier film may be removed or may be remain as part of the final device.

According to one embodiment, the method for fabricating capacitors may include patterning an array of anode structures on a capacitor precursor laminate structure of a carrier and a metal layer adhered to the carrier. There may also be a step of etching an entire volume of the metal layer of each of the anode structures of the array or of substantially the entire thickness of the anode structures of said array or the like. An open accessible surface area of the metal layer may be increased accordingly. The method may also include anodizing the open accessible surface area of the anode structures. An oxide layer may be formed on the open accessible surface area of the metal layer to define anodes. There may be a step of establishing cathode counter-electrodes on each of the anodes. The method may also include attaching input/output structures to the anodes and to the cathode counter-electrodes. Given ones of the anodes, cathode counter-electrodes, and the input/output structures may define a capacitor unit. Multiple ones of the capacitor unit may define a capacitor array.

According to another embodiment of the present disclosure, there may be a method for fabricating a conductive polymer aluminum electrolytic capacitor. The method may include patterning an array of anode structures on a capacitor precursor laminate structure of a first carrier and an aluminum foil layer adhered to the first carrier. Each of the anode structures may be electrically interconnected and connected to a peripheral bus bar. The method may also include machining a plurality of holes into the aluminum foil layer of each of the anode structure(s), then etching an entire volume of the aluminum foil layer of the anode structures or of substantially the entire thickness of the anode structures of said array or the like to increase an open, accessible surface area thereof while maintaining electrical conductivity. There may be a step of anodizing the aluminum foil layers of the anode structures to define an oxide layer within the open, accessible surface area thereof and form anodes corresponding to the anode structures. There may also be a step of filling the open accessible surface area of the anodes with a conductive polymer material to define cathode counter electrodes. The method may further include applying a conductive carbon layer to the cathode counter electrodes. The conductive carbon layer may extend at least partially across respective ones of the cathode counter electrodes and defining conductive carbon segments. The method may also include a step of applying a metallic conductor layer to the conductive carbon layer. The metallic conductor layer may extend at least partially across respective ones of the conductive carbon layer and define metallic conductor segments. The method may also include connecting the metallic conductor segments to respective ones of cathode lead frames.

Another embodiment of the present disclosure is a capacitor with at least an anode and an anodized dielectric coating on the anode. The anode may have an accessible open pore surface area greater than 1.6 $m^2/cm^3$, and an anodized accessible open pore surface area may exceed 1.5 $m^2/cm^3$.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a conductive polymer aluminum electrolytic capacitor and fabrication methods thereof and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as top and bottom, left and right, first and second and the like are used solely to distinguish one from another entity without necessarily requiring or implying any actual such relationship or order between such entities.

The present disclosure contemplates a fabrication method for a conductive polymer aluminum electrolytic capacitor with increased capacitance per volume (C/Vol.), along with other desirable performance improvements with respect to equivalent series resistance (ESR) and the like. With reference to the flowchart of FIG. 1, one embodiment of the fabrication process begins with a carrier film 10, an aluminum sheet 12, and an adhesive 14 as shown in FIG. 2A. As shown in the cross-sectional view of FIG. 2A, in one embodiment, the aluminum sheet 12 is laminated onto the carrier film 10, and adhered together with a layer of the adhesive 14 in accordance with a step 100. The aluminum sheet may be adhered to the carrier film 10 either temporarily or permanently depending on the embodiment.

Figure 2A:
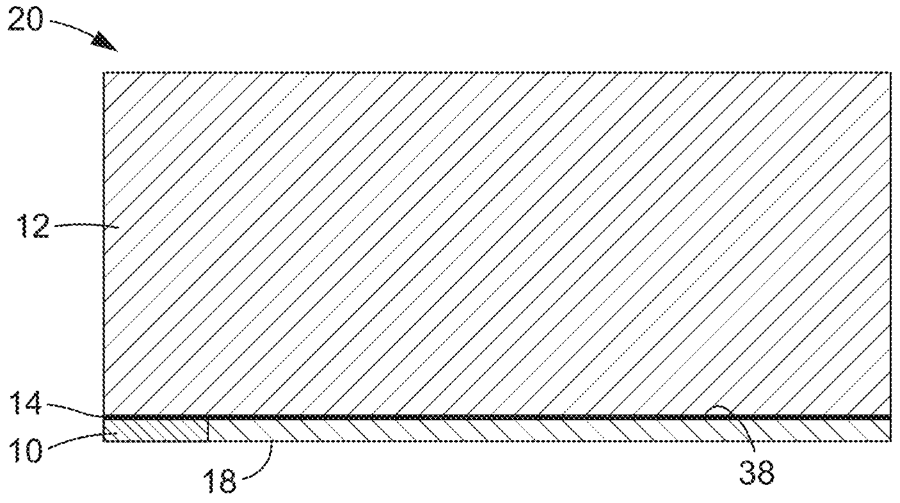
FIGS. 2A and 2B are cross-sectional views of anode precursor structures, with FIG. 2A showing a pre-etched state and FIG. 2B showing a post-etched state.
Figure 2B:
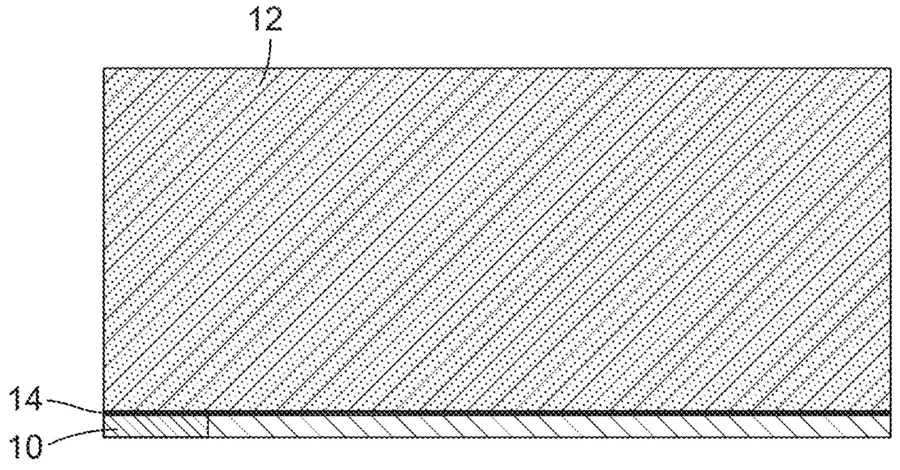

The aluminum sheet 12 may also be referred to as aluminum foil, and the description of the various embodiments makes reference to aluminum, but this is by way of example only and not of limitation. Any other suitable conductive metal material may be substituted, so equivalent structures of such alternative metal materials are intended to be applicable wherever the aluminum sheet 12 is referenced. According to preferred embodiments, the conductive metal has a high purity. Preferably, the purity is greater than or equal to 99%, though purity levels of greater than or equal to 99.6% and still further, 99.95% are ideal. The thickness of the aluminum sheet 12 is understood to be approximately the intended thickness of the final device, or as will be shown in greater detail below, some fraction of the intended thickness of the final device where multiple layers of the aluminum sheet 12 are stacked or mated atop one another. More specifically, one contemplated thickness range of the aluminum sheet 12 is between 0.0005 inches to 0.100 inches. Another contemplated thickness range of the aluminum sheet 12 is between 0.001 inches to 0.050 inches. Yet another contemplated thickness range of the aluminum sheet 12 is between 0.005 inches to 0.020 inches. Still another thickness range of the aluminum sheet 12 may be 0.007 inches to 0.018 inches. These aluminum sheet thicknesses are not completely comprehensive, however The aluminum sheet 12 may be in a planar sheet form, may be geometrically formed prior to lamination onto the carrier film 10, or in any other form. As will be described in further detail below, the embodiments of the present disclosure contemplate the etching of the entire volume or of substantially the entire thickness of the aluminum sheet 12 along the lines shown in FIG. 2B to increase the open accessible surface area.

In the embodiments in which the carrier film 10 is a permanent part of the final device, a material that can withstand relatively high temperatures, e.g., greater than 125 °C, or preferably greater than 150 °C, or more preferably greater than 200 °C may be selected. In a preferred embodiment of the present disclosure, however, the carrier film 10 is able to withstand temperatures of greater than 250 °C to 310 °C Such materials may be a polyimide film, including, for example, DuPont Kapton® and the like. Alternative material selections for the carrier film 10 include biaxially oriented polypropylene (BOPP), polyethylene terephthalate (PET), or other organic carrier film. It will be appreciated by those having ordinary skill in the art that any other suitable material may be substituted. The embodiments of the present disclosure envision the use of a carrier film with minimal thickness while providing suitable mechanical strength and electrical isolation. In one embodiment, the thickness of the carrier film 10 may be between 0.0001 inches and 0.010 inches. Preferably, the thickness range of the carrier film 10 is 0.0005 inches and 0.0075 inches. Another preferable thickness range of the carrier film 10 may be 0.0005 inches and 0.005 inches, and most preferably be in the range of 0.0005 inches and 0.002 inches.

The adhesive 14 is selected to provide suitable bonding between the aluminum sheet 12 and the carrier film 10 during and after the manufacturing process. Similar to the carrier film 10, the selected adhesive 14 is intended to withstand high temperatures, e.g., greater than 200 °C to greater than 300 °C. It is known that silicone and silane adhesives have such high temperature resistance. Alternatively, an adhesive that contains a thermal release agent, or the like may be utilized in the embodiments where the carrier film 10 is to be separated from the aluminum sheet 12. It is deemed within the purview of those having ordinary skill in the art to select the appropriate adhesive 14 for the intended fabrication process.

Figure 3:
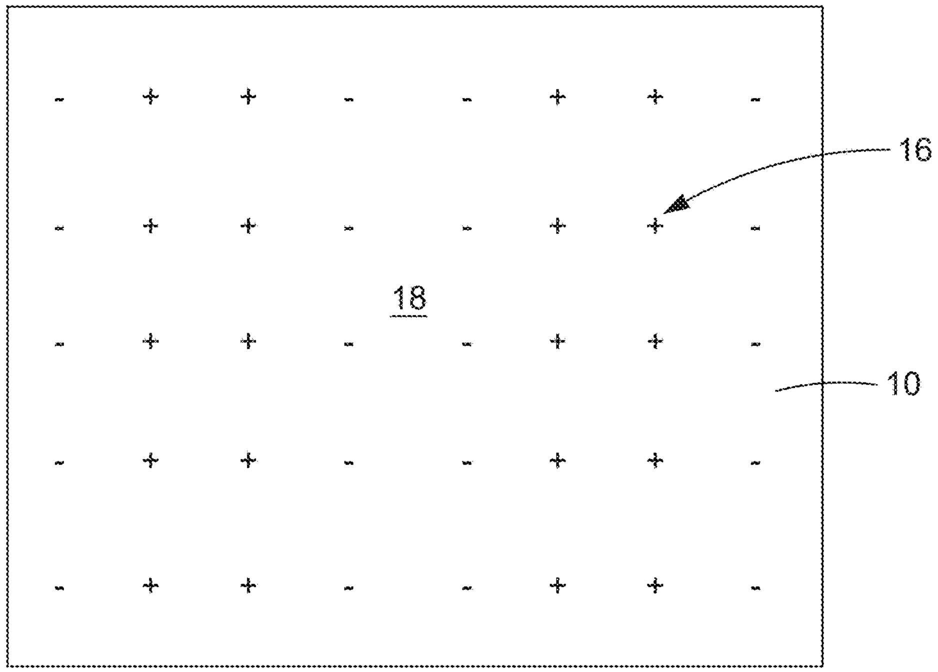
FIG. 3 is a bottom view of polyimide carrier film utilized in various embodiments of the present disclosure.

The aluminum sheet 12 may be laminated onto the carrier film 10 using reel-to-reel/continuous lamination as is common in the art. The mating surface or surfaces of either one of the carrier film 10 or the aluminum sheet 12, or both, may be pre-treated prior to lamination to enhance bonding. This pretreatment may be performed with plasma, electron beam (e-beam) treatment, or any other technique known in the art. The laminating adhesive 14 may be applied to one or more of the mating surfaces of the carrier film 10 and/or the aluminum sheet 12 prior to lamination. In some cases, anode structures may already be patterned on the aluminum sheet 12, in which case the patterned aluminum sheet 12 may be laminated onto the carrier film 10. The thickness of the laminating adhesive 14 is preferably as thin as possible while still achieving suitable permanent adhesion of the carrier film 10 and the aluminum sheet 12. According to techniques known in the art, the lamination process utilizes heat and compression to adhere the aluminum sheet 12 to the carrier film 10, followed by curing the adhesive 14. Either side or both sides of the carrier film 10, and/or the aluminum sheet 12 may include fiducial markings for alignment purposes during subsequent steps in the fabrication process. FIG. 3 shows such example markings 16 on a bottom or exposed bottom surface 18 of the carrier film 10. The markings 16 may be applied before or after lamination, and may indicate polarity (plus or minus) or any other information.

Figure 4:
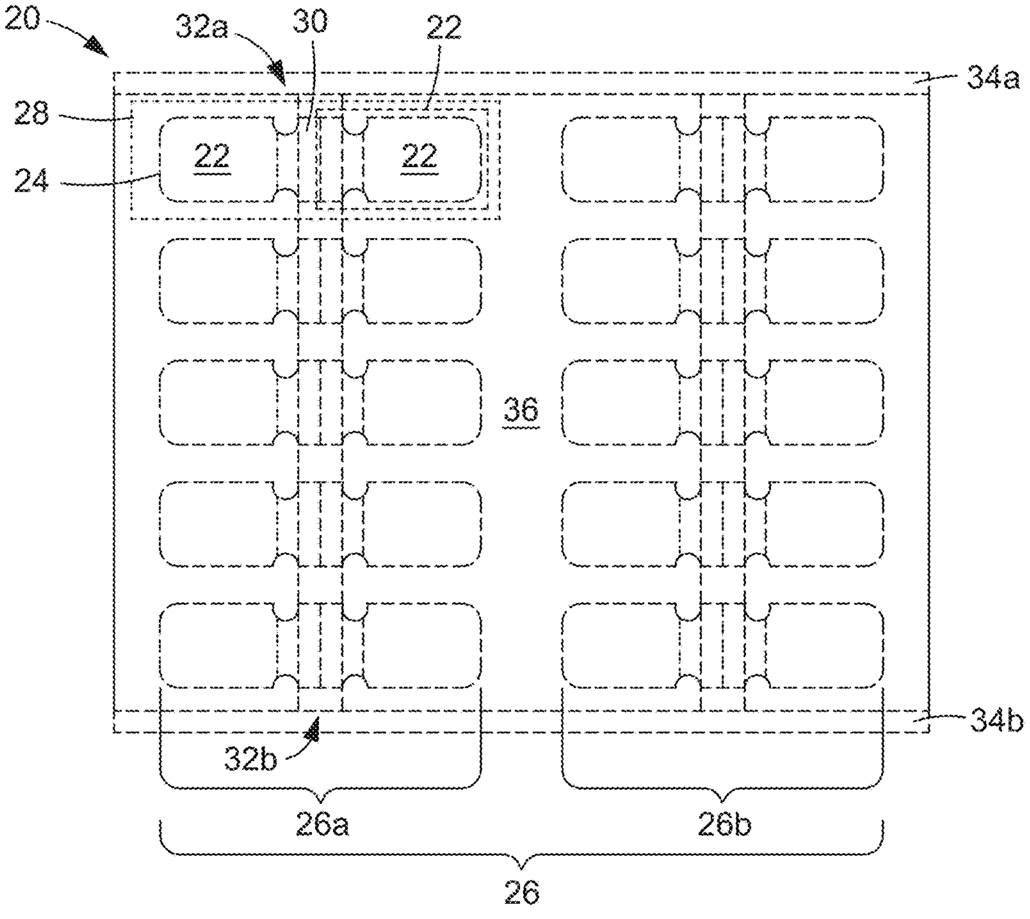
FIG. 4 is a top plan view of a capacitor precursor laminate structure with outlines of the anode precursor structure shown thereon.

The foregoing laminate structure of the carrier film 10, the aluminum sheet 12, and the laminating adhesive 14 may also be referred to as a capacitor precursor laminate structure 20. Referring back to the flowchart of FIG. 1, the method continues with a step 102 of shaping the anode precursor structures 22 that are formed on the capacitor precursor laminate structure 20. As best shown in FIG. 4, an outline 24 of the anode patterns correspond to multiple capacitors in an array 26 defined by a first column 26*a* and a second column 26*b*. Each anode precursor structure 22 corresponds to one completed capacitor, so in the depicted array 26, there are precursor structures to twenty (20) completed capacitors: the first column 26*a* defines ten (10) completed capacitors and the second column 26*b* defines another ten (10) completed capacitors. Each laterally adjacent pair 28 of anode precursor structures 22 is connected in the middle, with each of the pairs 28 in a column 26*a*, 26*b* being connected with an interconnect branch 30. Outer ends 32*a*, 32*b*, of the interconnect branch are, in turn, connected to a respective bus bar structure 34*a*, 34*b*. Although the anode precursor structures 22 and pairs 28 thereof, the columns 26, the interconnect branch 30, and the bus bar structures 34 are referenced as discrete components, this is for the sake of convenience to identify specific structural portions of the overall aluminum sheet 12 after patterning. As illustrated, these components may be provided as a single, contiguous structure, and are in electrical communication/electrically connected.

The anode precursor structures 22 may be formed by photolithography, by mechanical machining, laser machining, or electron beam machining. The cuts of the outline 24 may be defined from a top surface 36 of the aluminum sheet 12, or from the bottom surface 18 of the carrier film 10. In a preferred embodiment, the cuts for the outline 24 are made from the top surface 36 of the aluminum sheet 12, and extend to a top surface 38 of the carrier film 10.

Figure 5A:
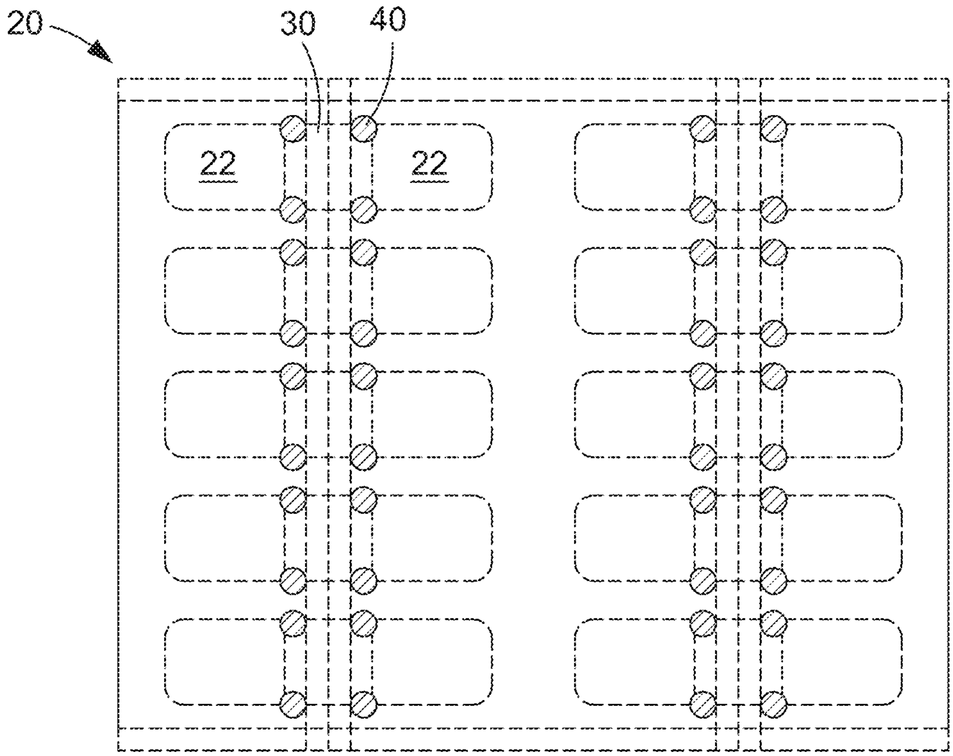
FIG. 5A is a top plan view of the capacitor precursor laminate structure with support holes drilled therein.
Figure 5B:
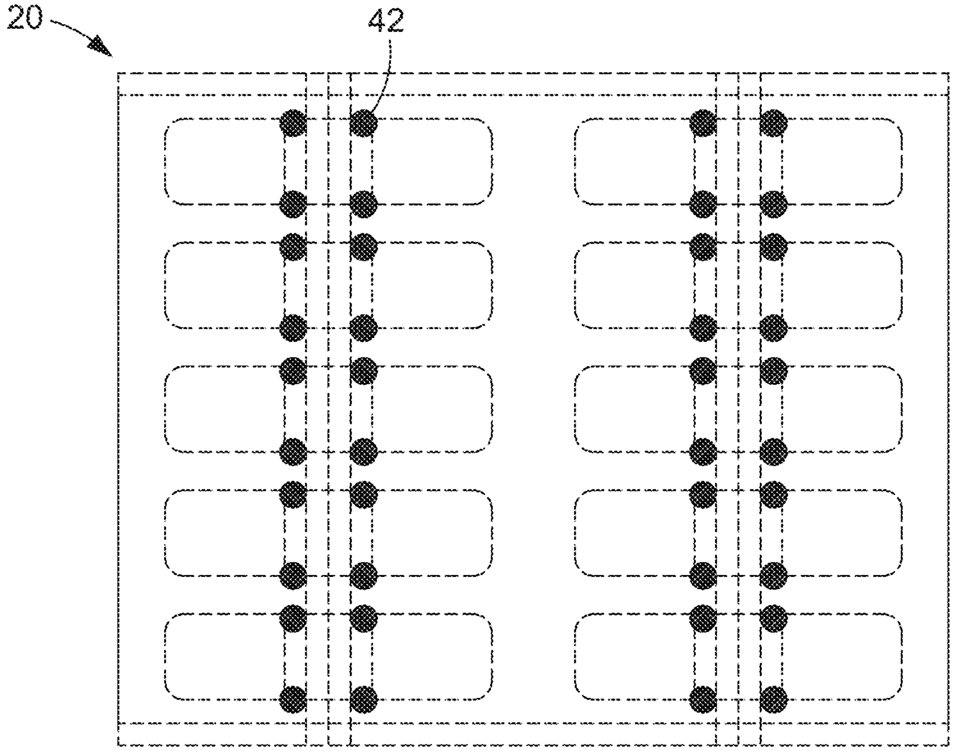
FIG. 5B is a top plan view of the capacitor precursor laminate structure with support holes filled with insulating material.
Figure 5C:
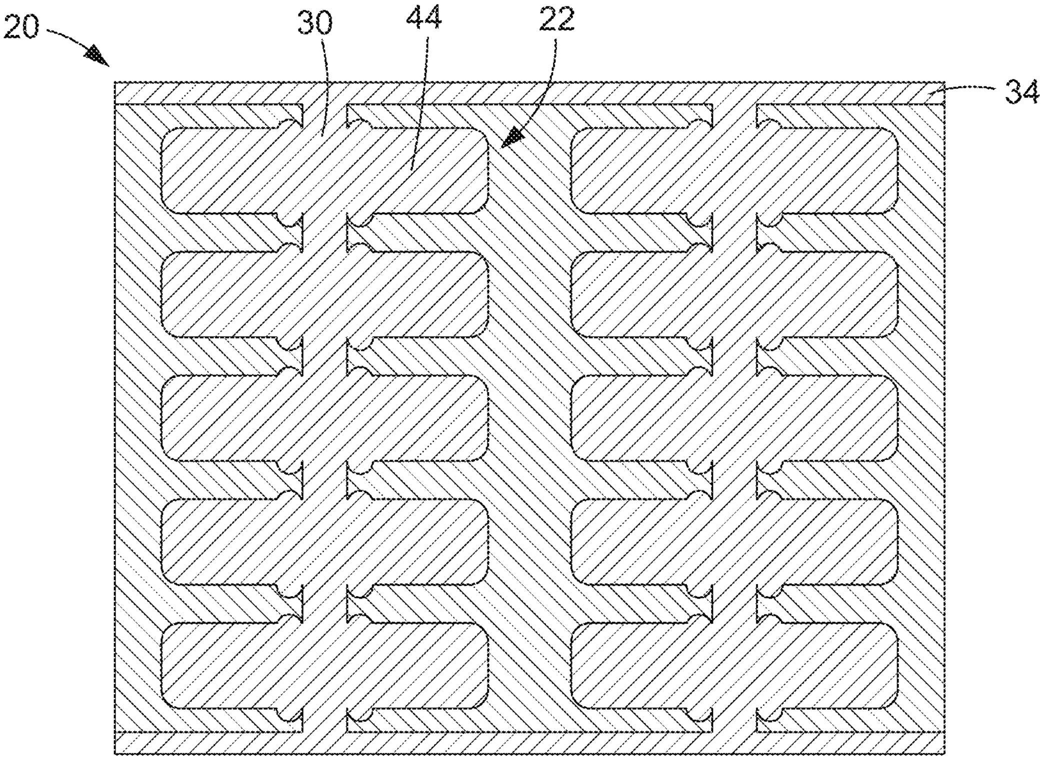
FIG. 5C is a top plan view of the capacitor precursor laminate structure with a mask applied to those regions corresponding to the array anode structure that remains after a foil removal process step.

With reference to FIG. 5A, according to one embodiment, a series of holes 40 may be drilled into the capacitor precursor laminate structure 20 in those points corresponding to the opposing inner corners of the anode precursor structures 22 adjacent to the interconnect branch 30. The holes 40 may extend through the aluminum sheet 12 and to the carrier film 10, and may be drilled with a laser, an electron beam, photolithography, mechanical drilling, skiving, and so on. The holes 40 may also be blind holes that extend only partially through the aluminum sheet 12. Thereafter, as shown in FIG. 5B, the holes 40 may be filled with an electrically insulating material 42 such as silicone room temperature vulcanization (RTV) material. Such material may be precision dispensed as a liquid precursor, or polymerized plugs may be pressed into the holes 40. Thereafter, as shown in FIG. 5C, a masking layer 44 is applied to those regions of the aluminum sheet 12 corresponding to the anode precursor structures 22 as well as the interconnect branch 30 and the bus bar structure 34.

Figure 5D:
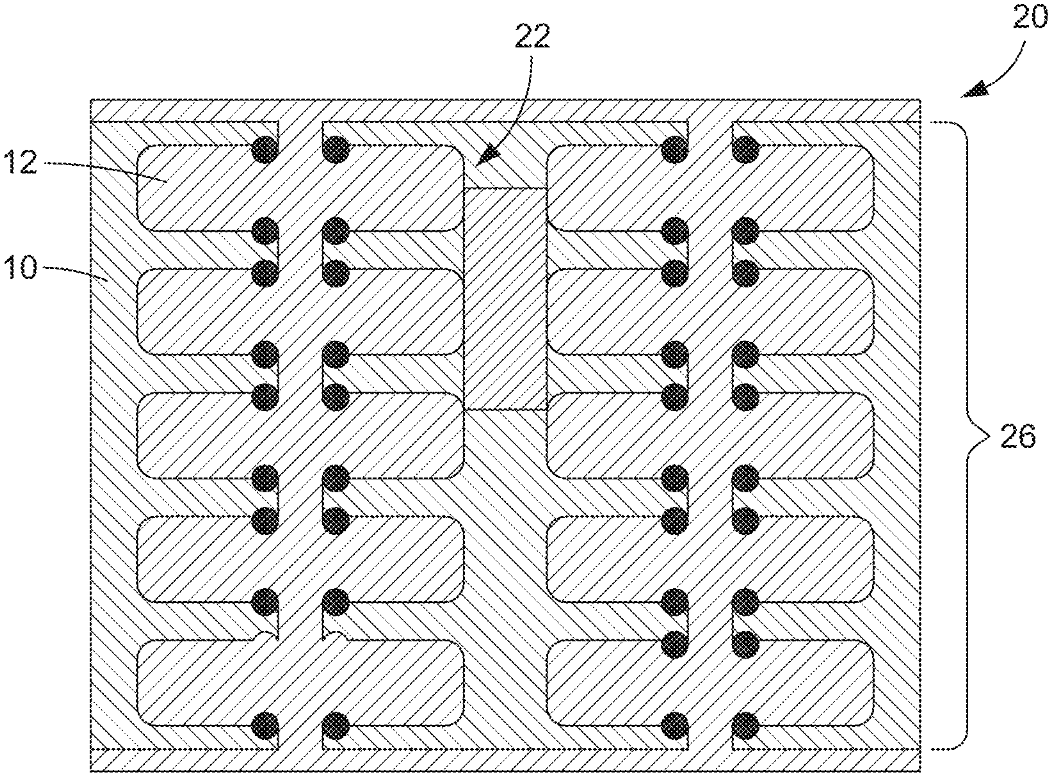
FIG. 5D is a top plan view of the capacitor precursor laminate structure following the foil removal process step.

With additional reference to FIG. 5D, the aluminum in the unmasked areas is removed to the carrier film 10 by way of an etching or milling process. It will be appreciated that laser milling, electron beam milling, mechanical milling or skiving, or any other suitable material removal process may be used. To the extent that such alternative precision material removal processes are used instead of an etching process, it may not be necessary to apply a mask and so such step may be omitted. Where a mask is used, following the completion of the etching/milling process, the mask may be removed to show the underlying aluminum structure. Before proceeding to the next fabrication step, the array 26 of anode precursor structures 22 may be washed, dried, and otherwise treated.

Figure 6:
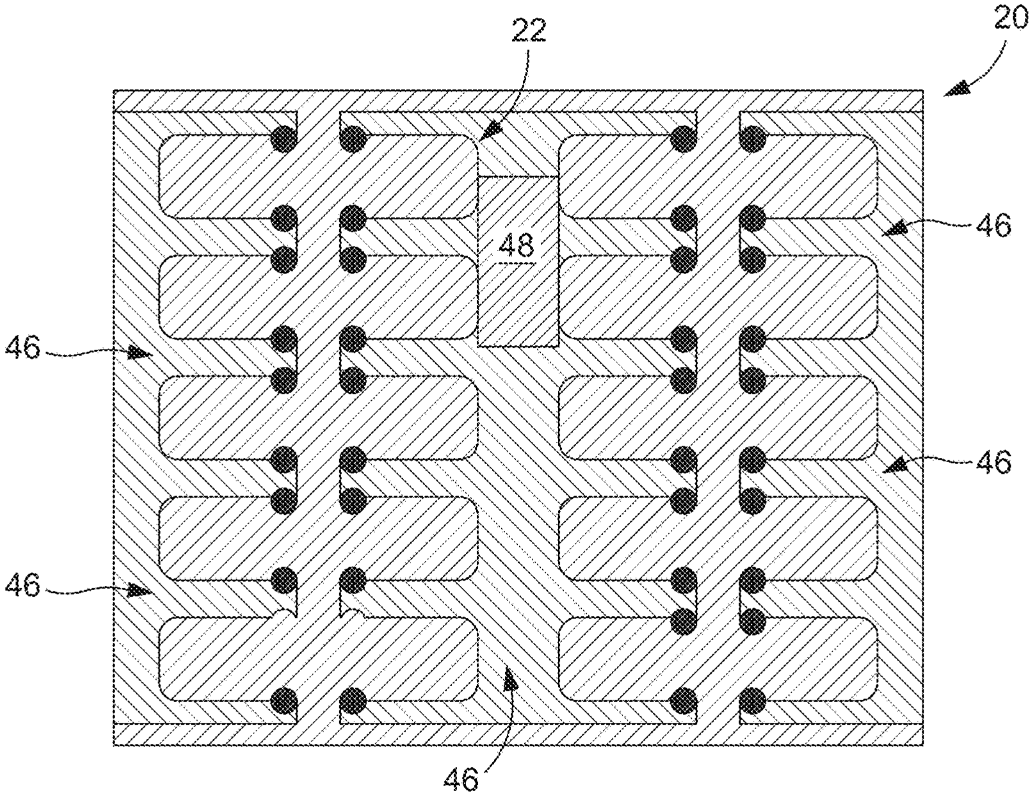
FIG. 6 is a top plan view of the capacitor precursor laminate structure following an insulator fill process step.
Figure 7:
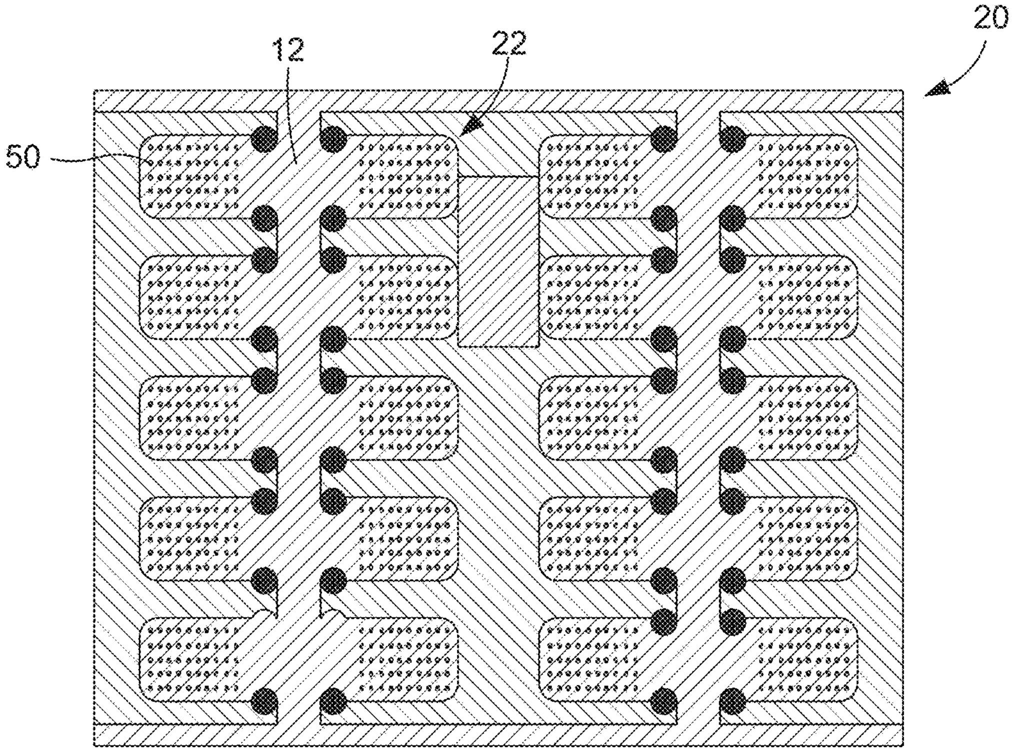
FIG. 7 is a top plan view of the capacitor precursor laminate structure following a hole machining process.

The etched/milled areas of the aluminum sheet 12 may be filled with an electrically insulating material before proceeding to the next step. The process is understood to be similar to that of filling the holes 40. As best illustrated in FIG. 6, one or more suitable insulating materials are flowed into alleys 46 between the patterned anode precursor structures 22 to define an insulation layer 48 which may cover any portion or all of alleys 46, and may fill alleys 46 to a depth suitable for the intended application. The insulating material may be a silicone material, room temperature vulcanizing (RTV) silicone material, epoxy material, acrylic material, urethane material, or any other suitable conformal electrically insulating material. After the insulating material is deposited, it may be polymerized.

The foregoing lamination and anode precursor structure definition process is in accordance with one embodiment of the present disclosure. Alternatively, the array structure with the individual but interconnected anode precursor structures may be pre-fabricated and laminated onto the carrier film 10 with the adhesive 14.

Figure 1:
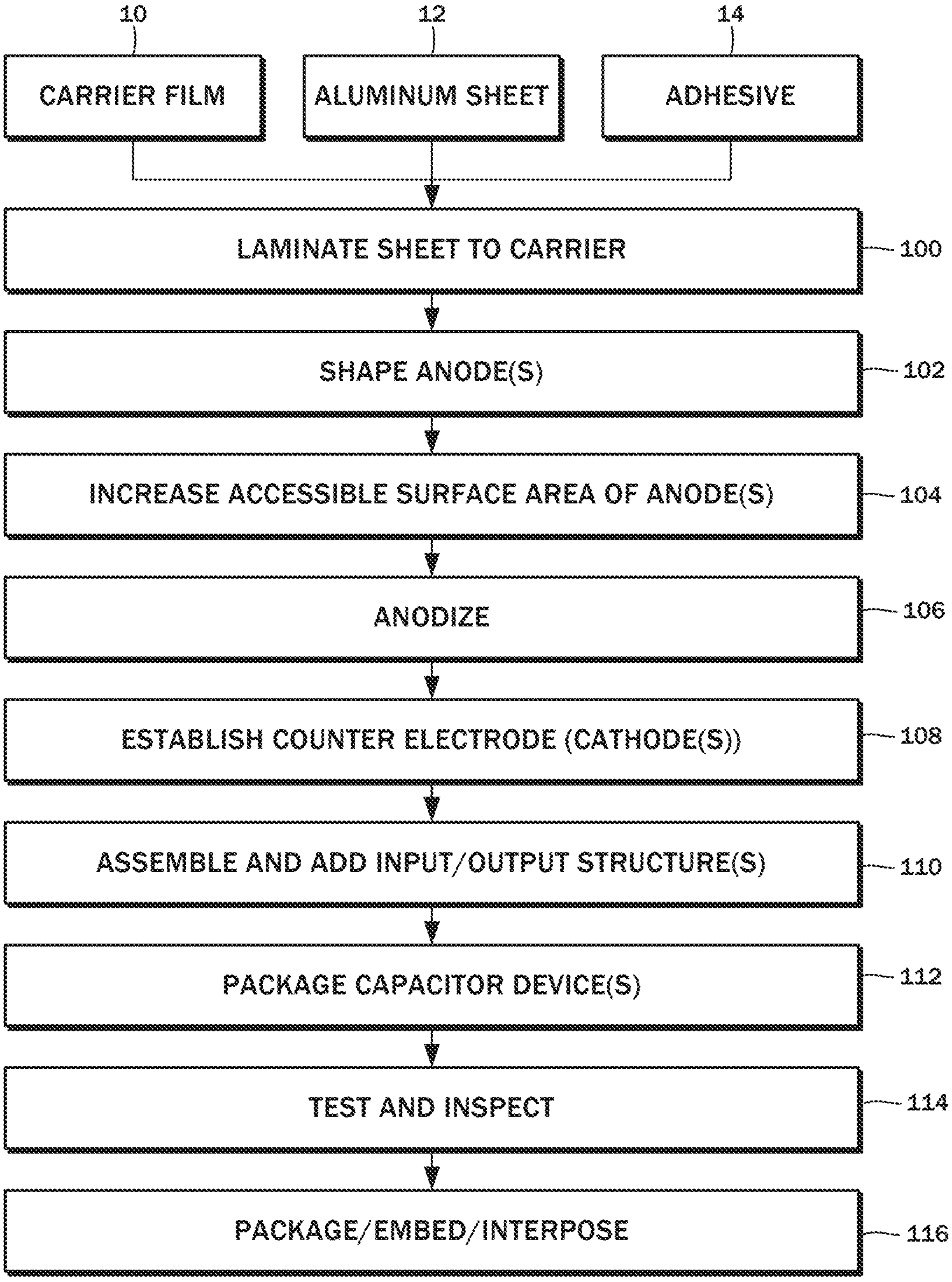
FIG. 1 is a flowchart illustrating steps of a method for fabricating an aluminum electrolytic capacitor in accordance with one embodiment of the present disclosure.

Referring back to the flowchart of FIG. 1, the fabrication method continues with a step 104 of increasing the accessible surface area of the anode, which corresponds to the anode precursor structure 22. The aluminum sheet 12 is supported on the carrier film 10, so substantially the entire thickness thereof may be etched to maximize the active portion and reducing or eliminating the inactive portion. In other words, there is no need to preserve an inactive portion for mechanical strength, as support is being provided by the carrier film 10. However, the entirety of the thickness need not be etched to realize the contemplated benefits. As will be described in further detail below, the step of maximizing the accessible pore volume and surface area may be achieved by chemical or electrochemical etching. The rate of increase in the surface area, as well as the uniformity of the accessible porosity may be optimized by machining a series of holes 50 into the aluminum sheet 12 in the areas of the anode precursor structure 22. The holes 50 may be opened by mechanical modalities such as drilling, skiving, water jet, micro sandblaster or the like, or by laser, electron beam, ion mill, and so on. Where a laser is utilized to create the holes 50, a single laser beam or multiple laser beams may be employed. A variety of shapes and depths of the holes 50 are contemplated, and the embodiments of the present disclosure are not intended to be limited to any particular configuration.

Figure 8A:
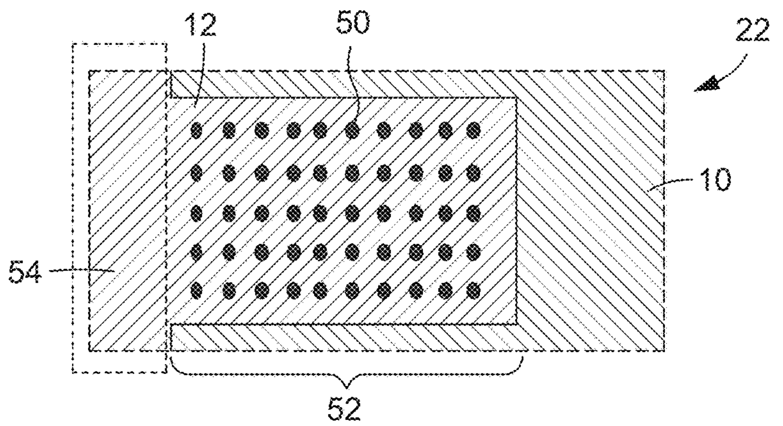
FIGS. 8A and 8B are top plan and side cross sectional views, respectively, of a single anode structure with holes in the anode structure according to one embodiment of the present disclosure.

FIG. 8A illustrates in greater detail the pattern of the holes 50 defined in the aluminum sheet 12. The holes 50 are understood to aid in the increase to the open accessible surface area of the resulting anode, and are positioned within a region 52 of the anode precursor structure 22 that overlap with a cathode counter electrode as will be described in further detail below. An end segment 54 that corresponds to an anode electrode is not etched and not drilled, therefore remaining in a solid condition.

Figure 8B:
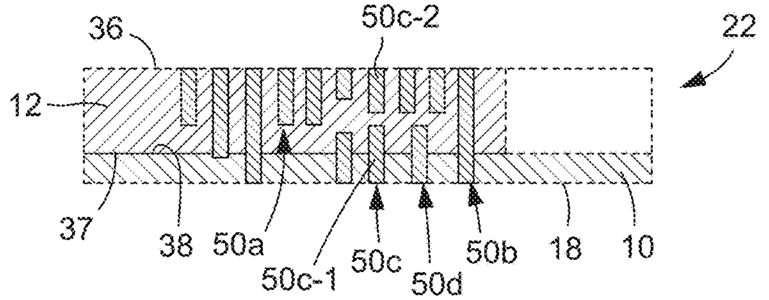

As additionally detailed in the cross-sectional view of FIG. 8B, a variety of configurations of the holes 50 is contemplated. Specifically, one type is a blind hole 50*a* that extends from below the top surface 36 of the aluminum sheet 12 to an interior of the same. In other words, the blind hole 50*a* does not extend to a bottom surface 37 of the aluminum sheet 12. Another configuration is a through hole 50*b* that extends from the top surface 36 of the aluminum sheet 12 through its entirety, and through the carrier film 10. The through hole 50*b* is open at both the top surface 36 of the aluminum sheet 12 and the bottom surface 18 of the carrier film 10. Another is an aligned hole 50*c* in which a first section 50*c*-1 extends from the top surface 36 of the aluminum sheet 12 but stops short of the bottom surface 37, and another second section 50*c*-2 axially aligned with the first section 50*c*-1 but is not contiguous therewith. Rather, the second section 50*c*-2 begins from above the bottom surface 18 of the carrier film 10 extending to the top of aluminum sheet 12, and stopping short of interconnecting with the first section 50*c*-1. Still another is a staggered hole 50*d* that extends from the bottom surface 18 of the carrier film 10 and into the aluminum sheet 12, but is not axially aligned with any other hole starting from the top surface 36 of the aluminum sheet 12.

The holes 50 define a cross-sectional area, with the diameter thereof having a dimensional range between 0.0005 inches to 0.050 inches. More specifically, the dimensions may range 0.001 inches to 0.025 inches, and more preferably between 0.001 inches to 0.010 inches. Within an even tighter range, the holes 50 may have a diameter between 0.0015 inches to 0.005 inches. The diameter range is preferable, but not totally inclusive. Preferably, the holes 50 are drilled on a pitch that maximizes accessible surface area, in either an etched, unetched or both etched and unetched configuration while maintaining electrical conduction within the anode precursor structure 22. The hole centers may be from 0.001 inches to 0.150 inches. More particularly, the range of the hole centers may be between 0.0015 inches to 0.100 inches, and more preferably from 0.002 inches to 0.090 inches. Within an even tighter range, the center of the holes 50 may be between 0.0025 inches to 0.080 inches. In some embodiments, the cross-section of the holes 50 are circular, while in other embodiments, they are non-circular. The cross-sectional area of the holes 50 may also vary depending on its depth.

Figure 9:
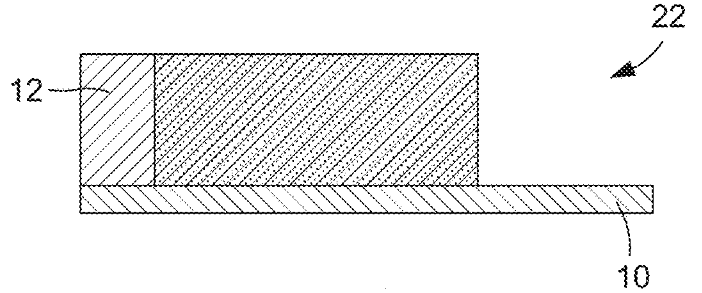
FIG. 9 is a side cross-sectional view of an anode precursor structure following an etching process to increase the accessible open pore surface area thereof.

The holes 50 are formed on the active portion of the anode precursor structure 22 to promote the maximum formation of accessible surface area therein. After the formation of the holes 50, there is a second etching step. FIG. 9 illustrates a cross sectional view of the anode precursor structure 22 with the aluminum sheet 12 having been etched. This is understood to result in a surface structure along the lines shown in FIG. 10. In accordance with various embodiments of the present disclosure, the holes 50 permit access to the interior volume of the anode precursor structure 22 for etching.

Figure 10:
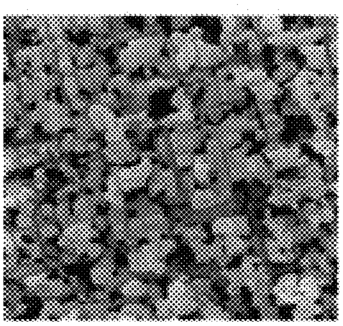
FIG. 10 is a detailed view of the etched accessible surface area.

The etching process is contemplated to increase the accessible open pore surface area throughout substantially the entire thickness of the aluminum sheet 12 corresponding to the anode precursor structure 22 without unacceptably degrading the mechanical or electrical properties of the same. According to one embodiment of the present disclosure, an open pore surface area of greater than 1.6 $m^2/cm^3$ is possible. It will be appreciated that over-etching should be avoided to prevent compromising the electrical and mechanical integrity of the anode precursor structure 22. The etching process may be chemical or electrochemical, though in preferred embodiments, the etching process is electrochemical. The etching chemistry may be selected to be suitably corrosive to the aluminum material such that pits are formed on the surface as shown in FIG. 10. Etching bath chemistry may be acidic, neutral, or basic, and preferably includes chlorine. In further detail, the etching chemistry may be one or more of hydrochloric acid, and salts thereof, aluminum chloride and salts thereof, ferric chloride, or other chlorine-containing acids or salts such as sodium chloride and the like. Chlorine-containing etching chemistry is selected as chlorine ions tend to promote corrosion or pitting as needed for the contemplated application. Corrosion may be controlled with one or more organic acids, either alone or in combination with mineral acids, as well as with water and other additives as suitable to control pH, conductivity, bath activity, and other chemical or electrochemical etching. Etching bath temperature may also be controlled to optimize etching rate and uniformity.

In an electrochemical etching process, a direct current, alternating current, pulsed current, or a combination thereof may be utilized. A direct current etching process may be preferable to create pores with a high aspect ratio in the thickness direction of the aluminum sheet 12, while an alternating current may be used to maximize accessible surface area while maintaining mechanical integrity and electrical conductivity of the anode precursor structure 22.

Uniform etching of bulk volumes may be facilitated by ultrasonic agitation during etching, varying etching current, and using different types of current. Additionally, enhancing etching solution flow near the etched surface and other known techniques to maximize uniformity may be performed.

The described electrochemical etching step is not intended to be limited to that which is described herein, and other treatments with different chemistries, electrical current modalities, temperatures, and treatment times may be substituted to achieve a desired pore microstructure with certain mechanical and electrical properties. The electrical current for the electrochemical etching is understood to be delivered through the bus bar structure 34 and the interconnect branches 30, which are laminated onto the carrier film as described above.

Figure 11:
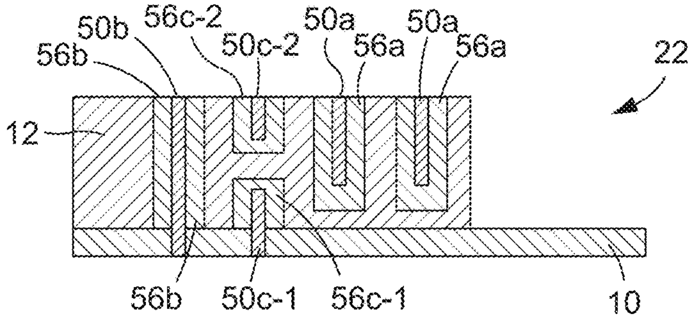
FIG. 11 is a side cross-sectional view of the anode precursor structure with the hole pattern and the accessible surface area etching process completed.

The cross-sectional view of FIG. 11 illustrates the additional accessible surface area that is created because of the holes and the etching process. The anode precursor structure 22 includes the first or blind holes 50*a* that extend at least partially into the aluminum sheet 12, with a corresponding etched accessible surface area 56*a* surrounding the same. Likewise, the anode precursor structure 22 includes a second or through hole 50*b* that extends the entire thickness of the aluminum sheet 12. Surrounding the through hole 50*b* is a corresponding etched accessible surface area 56*b*. There is also a third or aligned hole 50*c*, including a first section 50*c*-1 on the bottom half of the aluminum sheet 12 and a second section 50*c*-2 on the top half of the aluminum sheet 12. There are corresponding etched accessible surface areas 56*c*-1 and 56-*c*, respectively. The etched accessible surface areas 56 are maximized so that the capacitance per volume is correspondingly maximized.

Figure 12:
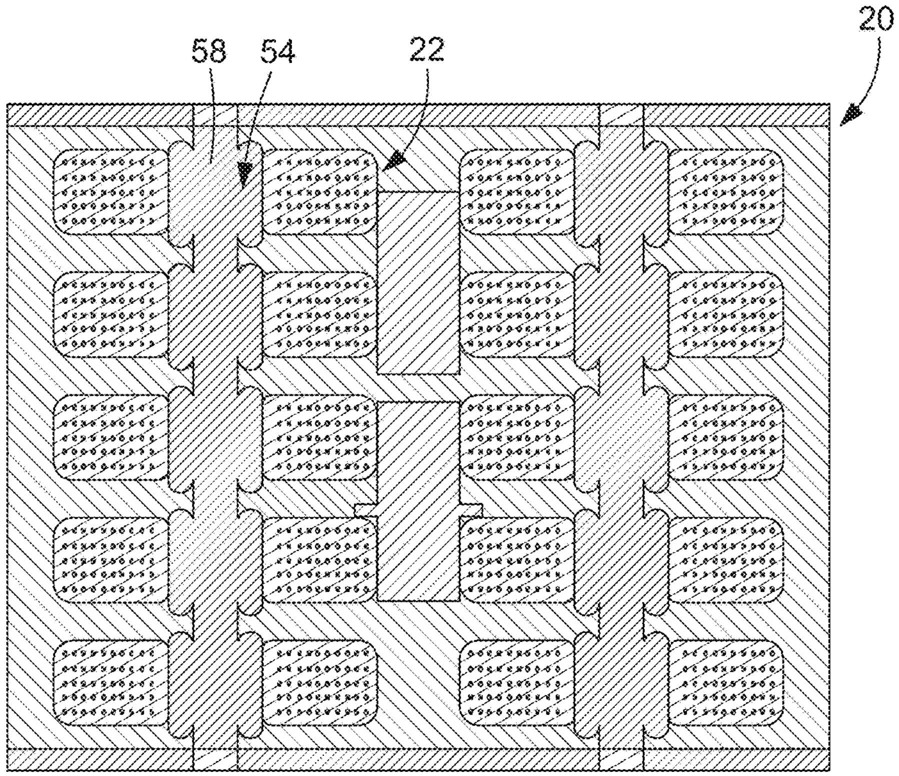
FIG. 12 is a top plan view of the capacitor precursor laminate structure with a mask applied to the anode before an etching step.

With reference to FIG. 12, another mask 58 may be utilized to prevent the etching of certain portions of the anode precursor structure 22. Specifically, the mask 58 is shown covering the anode electrode and the end segment 54 corresponding thereto of the anode precursor structure 22. The mask may remain on or may be removed as necessitated by the device design. In some embodiments, all or part of the carrier film 10 may be removed to expose the bottom surface 37 of the aluminum sheet 12 prior to etching. Additionally, carrier film 10 may be placed on the top surface 36 of the aluminum sheet 12 to achieve more uniformity in that the top surface 36 and the bottom surface 37 are etched substantially to the same extent.

Referring back to the flowchart of FIG. 1, once the accessible surface area of the anode precursor structure 22 is increased, the process continues with an anodizing step 106. Before doing so, the anode precursor structure may be cleaned in a suitable bath to remove any smut, debris, or other contaminants. An electrochemical process may be utilized for the anodization step, which forms a thin, uniform layer of oxide ($Al_2O_3$) film, preferably of a crystalline form that serves as the dielectric of the completed capacitor. The dielectric may also be an amorphous oxide or a combination thereof. The formation of the oxide layer may be achieved in an anodizing chemistry selected to form an oxide film without simultaneous dissolution of the film. The anodizing chemistry may include one or more weak acids or salts thereof. These may be either alone or in combination with other compounds. Anodizing acids may be boric acid, borax and associated salts, ammonium boric acid and associated salts, one or more amine phosphates such as ammonium phosphate, di-ammonium phosphate and associated salts, adipic acid and associated salts such as ammonium adipate, ammonium adipic acid and associated salts, dimethyl ethoxy ethanolamine, dimethyl ethanolamine and associated salts, tartaric acid and associated salts, citric acid and associated salts, ammonium citrate, tri-ammonium citrate and associated salts, phosphoric acid and associated salts, as well as other organic acids and associated salts.

The anodizing bath chemistry and temperature may be selected to provide suitable conductivity. Again, like the electrochemical etching process, electrical current may be delivered to the array 26 via the bus bar structure 34 and the interconnect branches 30 that are laminated onto the carrier film 10. The voltage and current density are selected to provide a high quality dielectric film, and the current may be a direct current, an alternating current, pulsed current, or a combination thereof. The formation voltage may be selected to be greater than the device rated voltage ($V_{rated}$) to ensure that the device will perform at $V_{rated}$ over its lifetime. The voltage may be gradually ramped to the full formation voltage in order to prevent the anodized film from burning. The anodizing process is performed for such duration that leakage current of the anodes is reduced to below the allowable device leakage current, thereby ensuring that the desired performance of the capacitor continues over its intended lifespan. The thickness of the completed oxide layer is determined from the device rated voltage while not significantly reducing the accessible open pore structure area.

Figure 13:
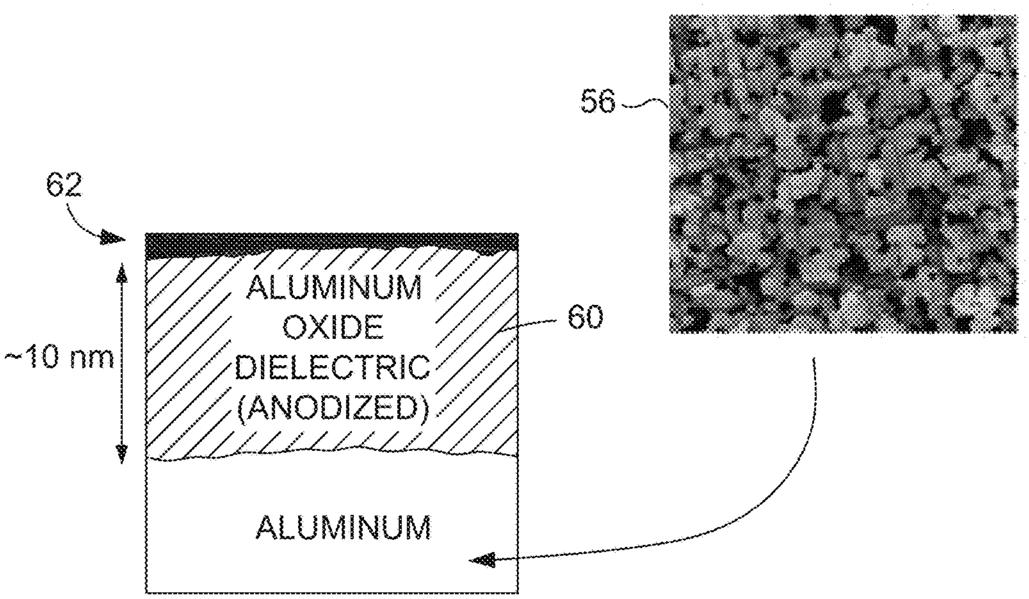
FIG. 13 depicts an example etched surface area and a cross section showing the dielectric and metal foil layers following the dielectric formation step.

As shown in FIG. 13, the etched accessible surface area 56 is covered by a layer 60 of the aluminum oxide dielectric. The metal layer and the dielectric layer 60, which is about 10 nm in thickness, defines the structure of an anode 62. This is specific to a 6.3 $V_{rated}$ device. Accordingly, the approximately 10 nm oxide dielectric thickness resulting from the anodization does not reduce the accessible surface area, as this has a role in the infiltration of the open pore structure with the conductive polymer or the conductive polymer precursor. The various embodiments of the present disclosure contemplate an anodized accessible open pore surface area exceeding 1.5 $m^2/cm^3$.

Referring again to the flowchart of FIG. 1, after anodization, the process proceeds to step 108 of establishing the counter electrode or cathode(s). Before doing so, however, the formed anodes 62 may be rinsed and dried. The drying temperature and duration may be selected to preserve or restore, that is, dehydrate, the $Al_2O_3$ dielectric, as the anodes 62 may have become hydrated. According to a preferred embodiment, the anodes 62 may be dried at a temperature above 150 °C but less than or equal to 310 °C for thirty minutes or longer. In general, the drying conditions may be selected to avoid damage to either the carrier film 10 and/or the adhesive 14.

Figure 14:
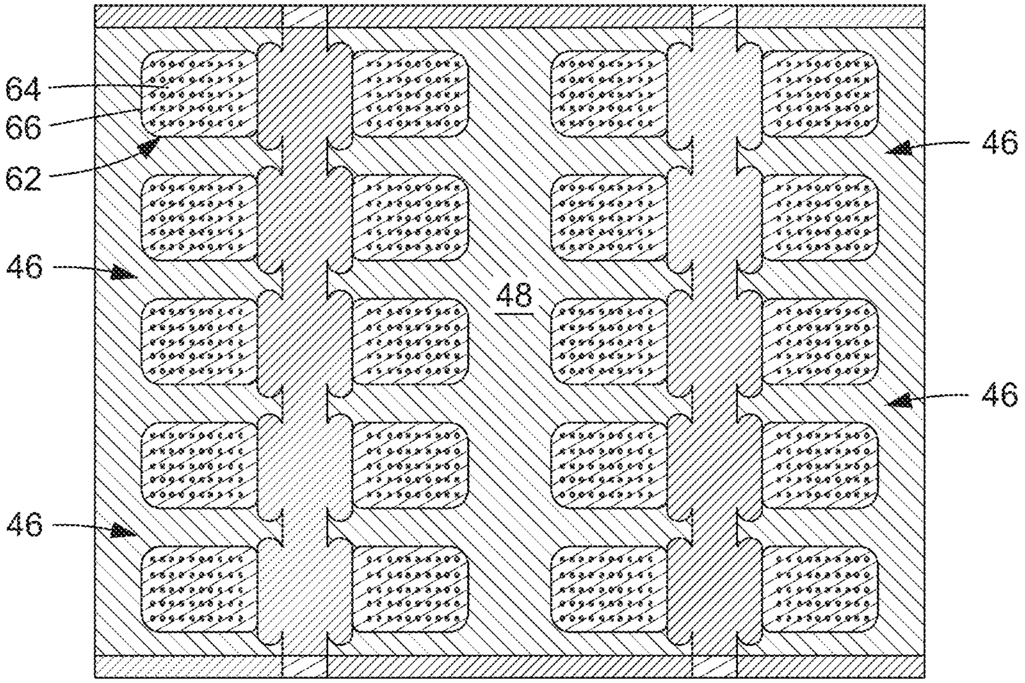
FIG. 14 is a top plan view of the array anode structure with portions of the metal foil filled with a conductive polymer to establish cathode counter-electrodes.

In further detail shown in FIG. 14, once the anodes 62 are dried, a conductive polymer 64 is disposed on and into the open pore structure of the anodes 62. The formed and dried anodes 62 may have a mask thereon as needed prior to cathode formation to create an unshorted, high insulation resistance or low leakage current capacitor devices. The conductive polymer material is envisioned to cover substantially the entirety of the accessible open pore surface area, creating the cathode. This is completed while avoiding damage of the dielectric/oxide layer 60. This impregnation process may be assisted by reducing the viscosity of the liquid conductive polymer material and the active percentage concentration of the same, the addition of wetting additives, ultrasonic agitation, higher temperatures, higher pressure (and/or vacuum), and circulation of the media, gas blanketing on the surface of the bath to minimize evaporation, and so on. As the entire structure of the anode 62 is electrically interconnected, electric current or bias may be used to enhance the deposition of the conductive polymer 64 within the open pore structure via electrophoretic deposition.

The conductive polymer 64 may have different chemistries and/or layers of different chemistries and materials. The conductive polymer 64 or a precursor thereof may be infiltrated into the open pore structure of the formed anode 62 by dipping the same into the conductive polymer or conductive polymer precursor liquid of relatively low viscosity and appropriate wetting properties. Again, pre-treatment, dipping rate, and immersion time, among other parameters, are selected to ensure complete coverage of the accessible open pore surface area. The anodes 62 may be removed from the conductive polymer solution bath and dried to develop the conductive polymer 64. The foregoing sequence may be repeated in order to achieve complete coverage of the open pore surface area with the conductive polymer 64. Once the conductive polymer 64 is infiltrated into the accessible open pore surface area, a cathode 66 is defined, with the boundary thereof being defined by the same metallic structure of the anode 62.

The cathode 66 or counter electrode material may be an organic conductor in accordance with various embodiments of the present disclosure. These include tetracyanoquinodimethane (TCNQ), polypyrroles, polyanilines, polyacetylines, polyindoles, poly(p-phenylene vinylene), poly(thiophene)s, poly(3,4-ethylenedioxythiophene) (PEDOT), and poly(p-phenylene sulfide) (PPS). Preferably, the conductive polymer may be a combination of PEDOT and PSS, which may be modified to optimize desirable capacitor properties such as ESR.

As indicated above, before establishing the cathode or counter electrode, the alleys 46 between the individual anodes 62 may have been filled with an electrical insulation layer 48 such as silicone, epoxy, acrylic, urethane/polyurethane, polyimide, parylene, and so forth. This material may be liquid, paste, or plastic solids of precursors of such materials. The insulator material may be deposited with a computer-controlled nozzle or other such precision deposition modality. Other methods including screen or stencil printing, dipping of a masked array, and so on may also be used. By completing this step before installation of the conductive polymer 64, access to one or more specific portions of the anode 62 may be limited. Areas, lanes or alleys 46 between the individual anodes 62 may be cleaned with a liquid bath or liquid stream containing water or organic solvent suitable to remove the conductive polymer 64 deposited therein. Laser or electron beam ablation of the conductive polymer 64 from these areas is also contemplated, either alone or in combination with solvent bath cleaning to selectively remove the conductive polymer 64 from undesired areas.

Figure 15:
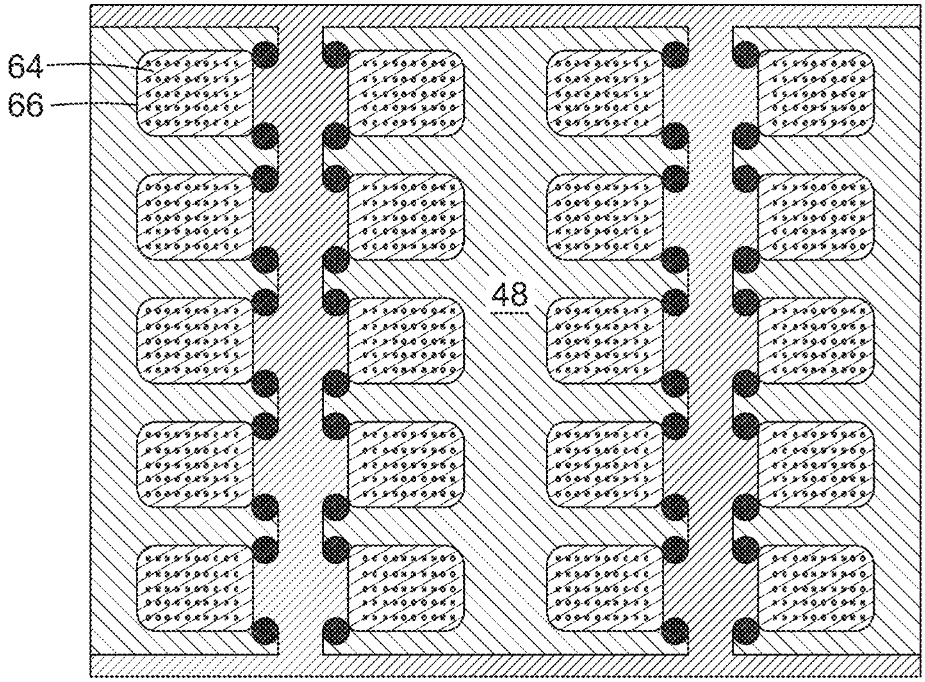
FIG. 15 is a top plan view of the array anode structure with the mask on the anode removed.
Figure 16:
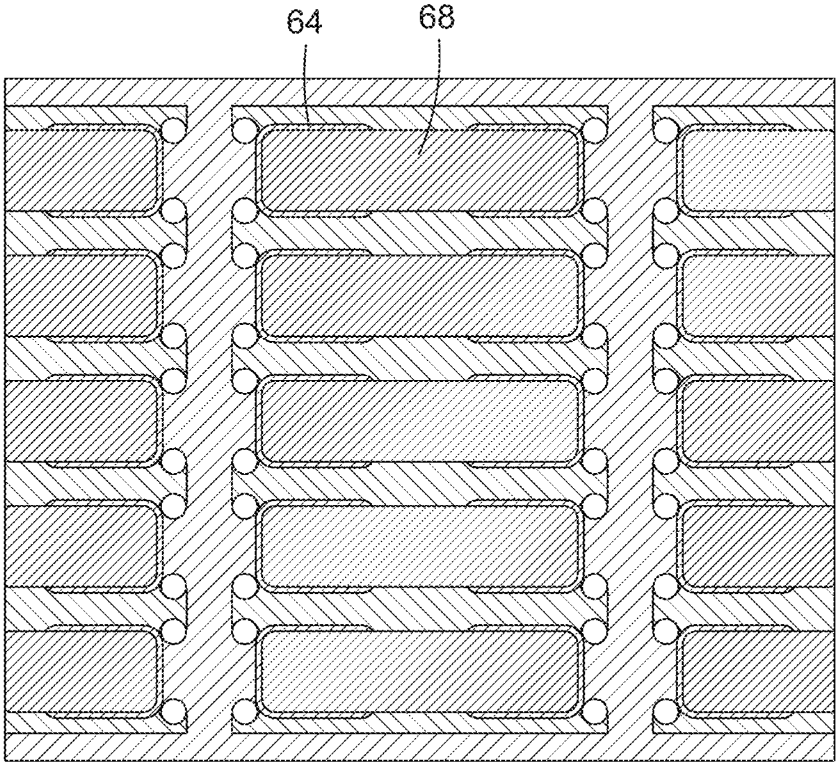
FIG. 16 is a top plan view of the array anode structure with a conductive carbon layer applied to the cathode counter electrodes.

The counter electrode or cathode 66 includes several additional layers, and prior to the deposition of such additional layers, the mask 61 may be removed as shown in FIG. 15. Then, as shown in FIG. 16, a conductive carbon layer 68 may be deposited on top of the conductive polymer 64 via thick film techniques such as screen or stencil printing or pad printing or the like. The conductive carbon layer 68 may be carbon black, graphite, graphene, or similar materials serving to transition from the conductive polymer to other cathode electrode material(s).

Figure 17:
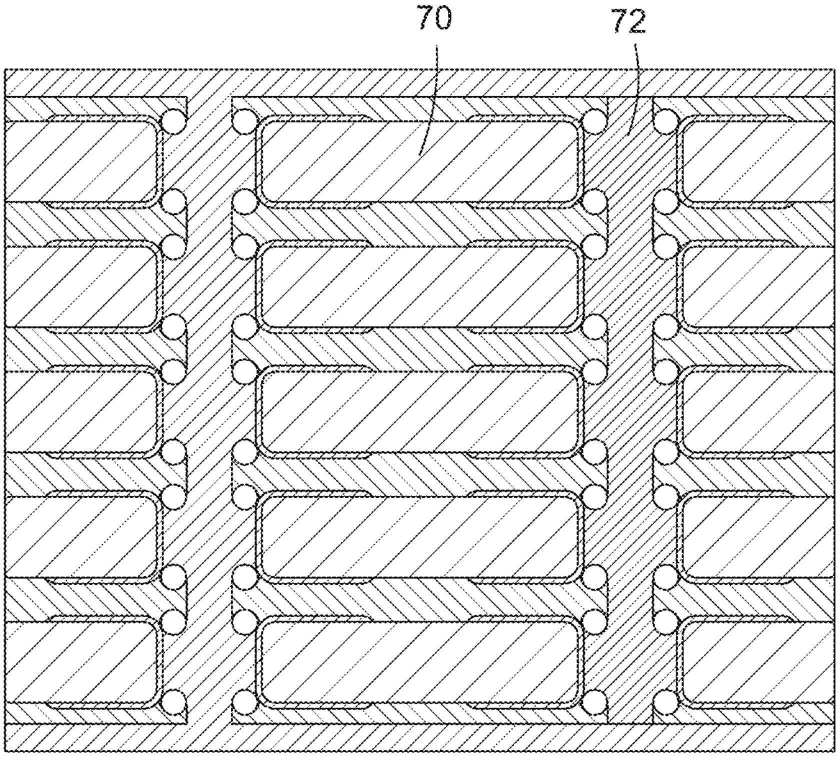
FIG. 17 is a top plan view of the array anode structure with a metallic conductive layer applied to the conductive carbon layer, as well as an optional insulation layer over the anode.

A second metal/conductive layer 70 covers the conductive carbon layer 68, which may be a silver material as indicated in FIG. 17. A thick film deposition technique may be utilized, or a thin film deposition method (e.g., sputtering) may be utilized. This conductive layer 70 is intended to achieve a mechanically robust, electrically conductive structure that may be connected to a cathode lead frame structure. This fabrication step is understood to correspond to step 110 as shown in the flowchart of FIG. 1 of assembling and adding input/output structures. The resulting capacitor is envisioned to have a robust external cathode connection. Optionally, as shown in FIG. 17, an electrically insulating material 72 may be applied to an unetched portion of the anode 62, also referred to as an anode electrode 63.

Figure 18:
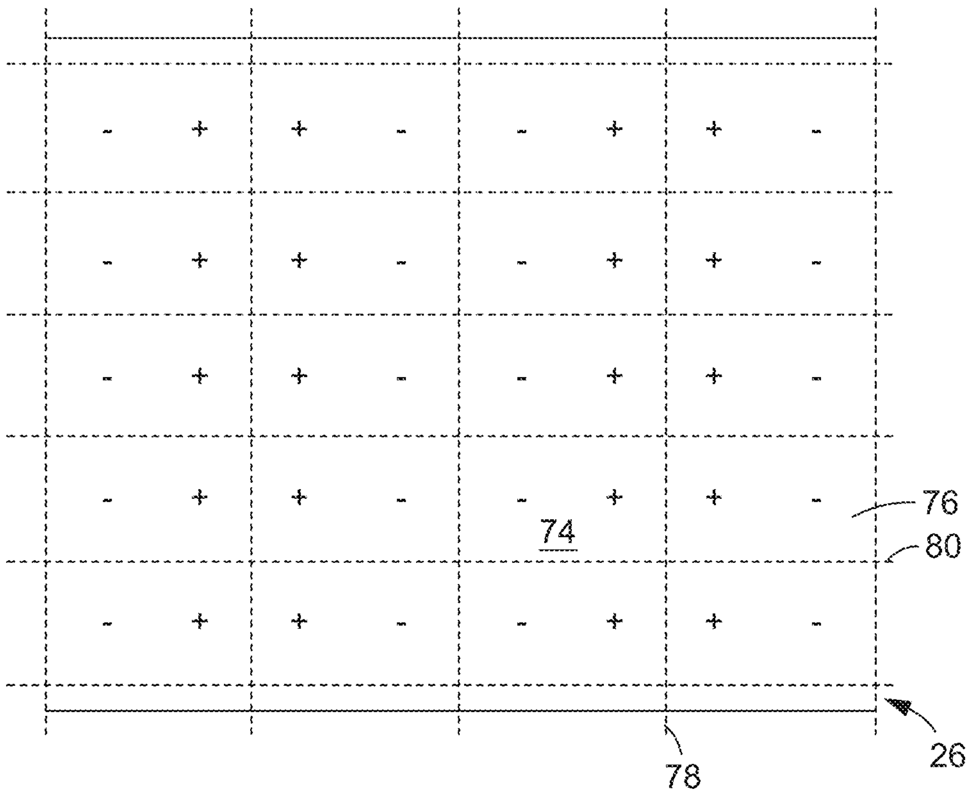
FIG. 18 is a top plan view of the array anode structure with a second carrier layer adhered thereto.
Figure 19:
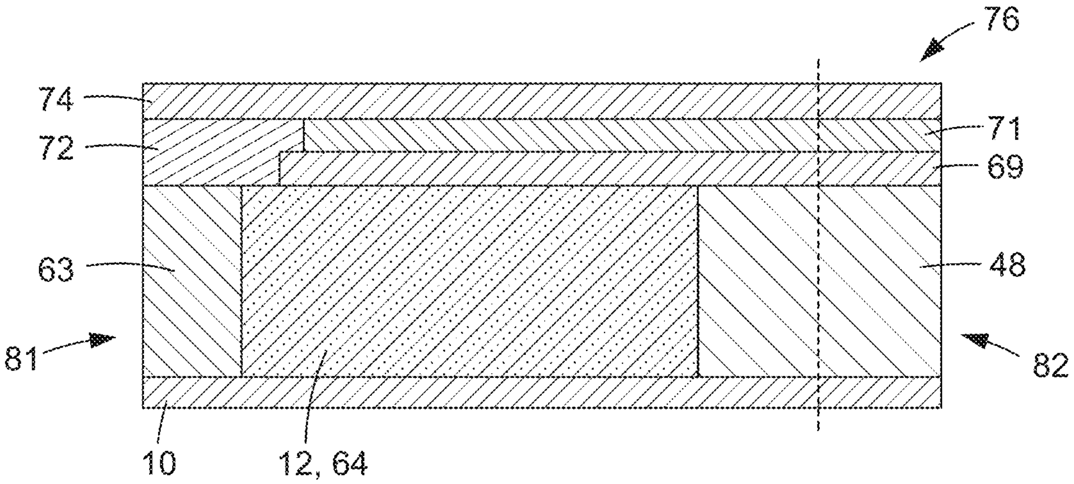
FIG. 19 is a cross-sectional view of a first embodiment of a capacitor unit fabricated in accordance with the present disclosure.

The fabrication method then proceeds to a step 112 of packaging the capacitor device. This also includes the optional removal or replacement of the carrier film 10, depending on the embodiment of the present disclosure. As best shown in FIGS. 18 and 19 a top insulation layer 74 may be added. The top insulation layer 74 may be a polyimide material such as DuPont Kapton®, or other suitable material such as BOPP or PET, or the like, and may be laminated to the structure with an appropriate adhesive, optionally together with the application of heat and pressure over a predetermined time period.

At this point, there is an array 26 of individual capacitor units 76 still connected together. These individual capacitor units 76 are singulated along a vertical singulation cuts 78 and horizontal singulation cuts 80.

The cross-sectional view of FIG. 19 illustrates an embodiment of a singulated capacitor unit 76 that includes the carrier film 10. The anode electrode 63 is disposed on a left end 81 atop the carrier film 10 and is understood to be a portion of the aluminum sheet 12 that was not etched or anodized. A central region includes the conductive polymer 64 that is impregnated into the open pore surface area of the aluminum sheet 12. The conductive polymer 64 is immediately adjacent to and abuts the anode electrode 63. To the right end also atop the carrier film 10 is the insulator 48. Upon singulation from the array, the conductive carbon layer 68 may be referred to as a single conductive carbon segment 69, which extends from a right end 82 of the capacitor unit 76 and atop the insulator 48 and the conductive polymer 64. On top of the anode electrode 63 and the conductive polymer 64 is the other optional insulator 72. The conductive layer 70 disposed on the conductive carbon layer 68 may be referred to as a conductive segment 71 upon singulation and likewise extends from the right end 82 of the capacitor unit 76 and terminates adjacent to the insulator 72. As the conductive segment 71 serves as the electrode for the cathode, it may also be referred to as a cathode electrode. Disposed above the insulator 72 and the conductive layer 70 is the top insulation layer 74.

Figure 20:
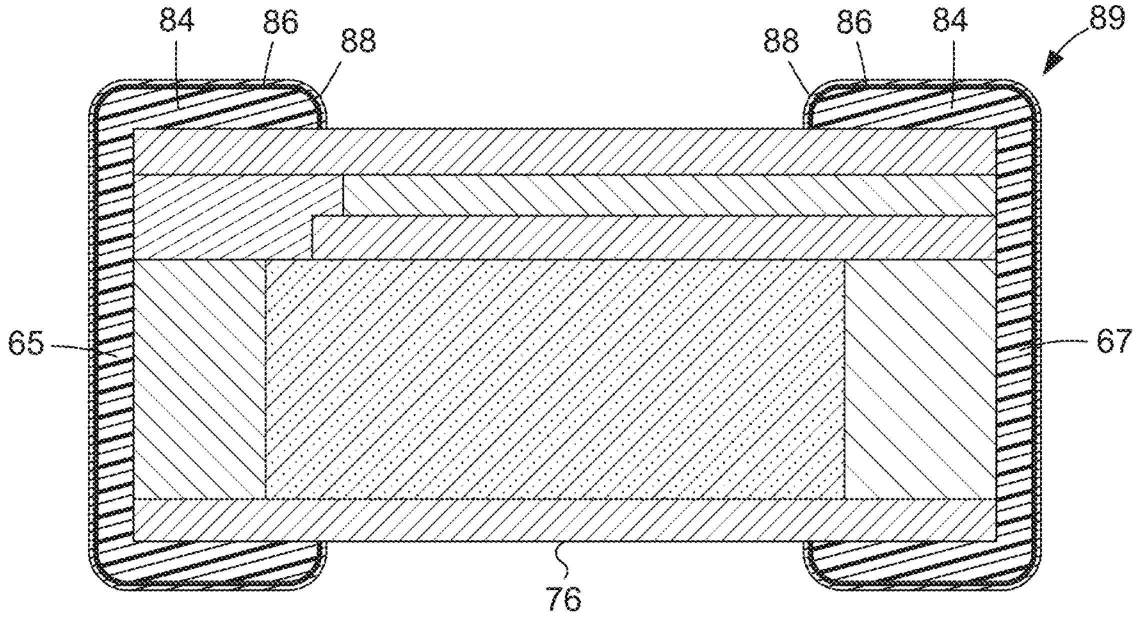
FIG. 20 is a cross-sectional view of a first embodiment of a capacitor package incorporating the first embodiment of the capacitor unit along line X-X of FIG. 23.

As shown in FIG. 20, the singulated capacitor unit 76 is terminated using a conductive epoxy 84 or the like, preferably silver. These structures may then be plated with nickel barrier layers 86 or the like and tin solder layers 88 or the like. This results in a completed capacitor device 89 with an anode terminal 65 and a cathode terminal 67. After singulation and packaging, the capacitor device 89 may be tested, marked and inspected in accordance with step 114, then added to external packaging for automatic assembly such as tape and reel, tray packaging, and so forth according to a step 116.

Figure 21:
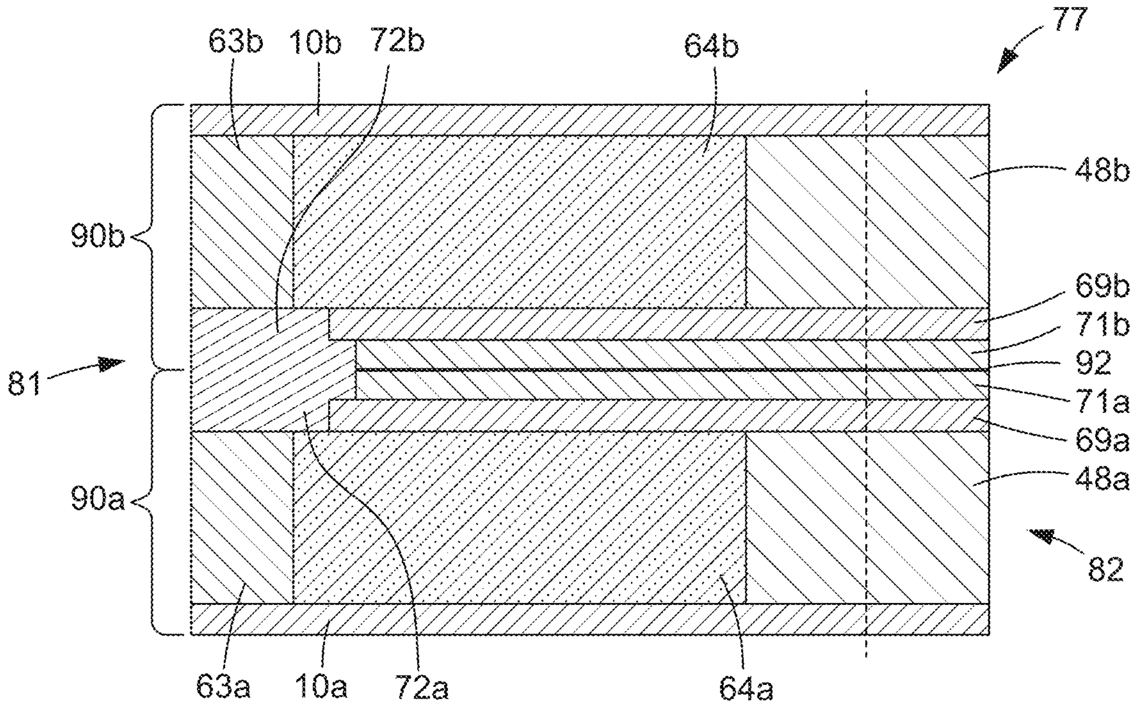
FIG. 21 is a cross-sectional view of a second embodiment of a capacitor unit in which two array anode structures are mated to each other in a facing relationship.

Two or more capacitor units 76 may be stacked or mated to another in a face-to-face relationship. Preferably, this is completed prior to singulation, so that an entire array 26 may be stacked on to another. FIG. 21 illustrates a second embodiment of a singulated capacitor unit 77 in which such a stacking/mating operation was completed. As shown, the capacitor unit 77 has a bottom half **90*a* and a top half 90*b*, both of which correspond to the capacitor unit 76, except for the omission of the top insulation layer 74 because the carrier film 10*b* of the top half 90*b* is substituted therefor. The top half 90*b* is laminated on to the bottom half 90*a*. The bottom half 90*a* and the top half 90*b* both include an anode electrode 63*a*, 63*b* on the left end 81, as well as insulators 72*a*, 72*b*. The bottom half 90*a* has the conductive polymer 64*a* and the insulator 48*a* disposed on the carrier film 10*a*, with a conductive carbon segment 69*a* disposed thereon. Atop the conductive carbon segment 69*a* is a conductive segment 71*a*. A conductive segment 71*b* of the top half 90*b* is adhered to the conductive segment 71, and so there is a layer of adhesive 92 between such structures. Stacked thereon is a conductive carbon segment 69*b*, and above which are the conductive polymer 64*b* and the insulator 48*b* of the top half 90*b*. This configuration is understood to increase the capacitance per device and provides an upper electrically insulating structure to the lower insulating structure that facilitates packaging in a device with increased capacitance per unit volume. Once assembled and singulated, the capacitor unit 77 may be further packaged, encapsulated, marked, tested, and inspected as described above in connection with the capacitor unit 76**.

Figure 22:
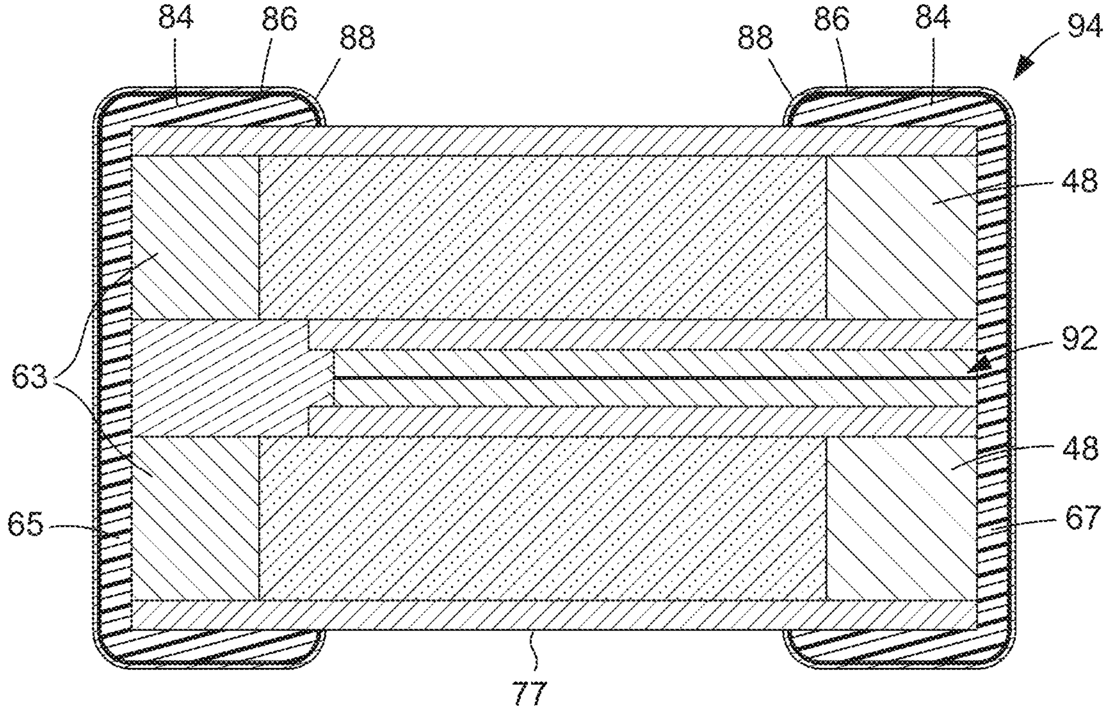
FIG. 22 is a cross-sectional view of a second embodiment of a capacitor package with the second embodiment of the capacitor unit along line X-X of FIG. 23.

FIG. 22 illustrates the singulated capacitor unit 77, which is similarly terminated using the conductive epoxy 84 or the like that is preferably silver or the like. These structures are then plated with nickel barrier layers 86 or the like and tin solder layers 88 or the like. This results in a completed capacitor device 94 with the anode terminal 65 and a cathode terminal 67. The capacitor device 94, as well as the capacitor device 89 described above, may be suitable for surface mounting or as embedded devices within a circuit board. These form factors are also appropriate as interposer devices that are on or within an active device package.

Instead of mating the capacitor units 76, alternative embodiments where the stacking is face-to-back are also possible, as well as other stacking modalities known in the art. Therefore, the stacking of the capacitor unit 77 is presented by way of example only and not of limitation.

The foregoing capacitor devices 89, 94 may be further encapsulated in an insulating material. The encapsulation may take place before termination, after termination, or both before and after termination. Where the encapsulation is completed before termination, the ends 81, 82 may be left electrically exposed, or those portions of the insulator 48 may be removed. Mechanical abrasion, sandblasting, skiving, or other mechanical techniques may be used, or laser ablation may be used. Where the encapsulation is completed after termination, a dilute encapsulant is preferred in conjunction with pressure and temperature to assure penetration and curing of the sealant. As will be recognized by those having ordinary skill in the art, this step is completed in a manner that avoids inhibiting the plating process. The encapsulation may also be applied after plating either the nickel barrier layer 86 or the tin solder layer 88. Regardless of the sequence, a low-viscosity silicone repellent, silane, tetraethyl orthosilicate (TEOS) or other suitable sealant may be used.

A conductive epoxy termination is typically applied by way of precision dipping and curing of silver-loaded epoxy thick film material. Alternatively, high-temperature spray techniques such as Schooping of aluminum and/or dry plating (e.g., sputtering) as known in the art may also be substituted for the termination process, or may be used as a part of the termination process. Still other alternative techniques include controlled dipping of the ends 81, 82 combined with immersion plating and/or electroplating may be utilized to establish the terminations of the capacitor devices 89, 94.

Figure 23:
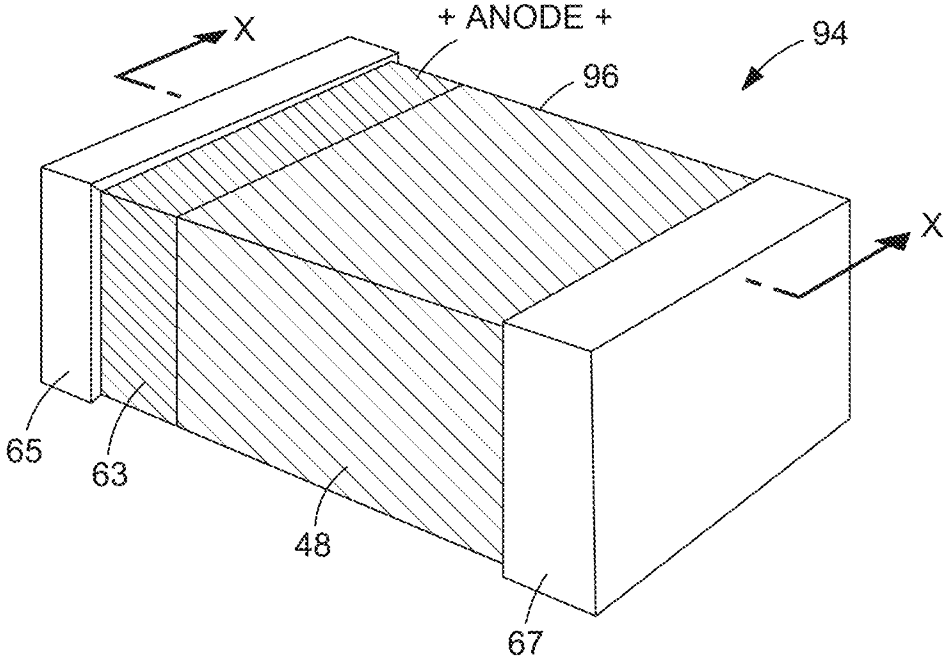
FIG. 23 is a perspective view of an exemplary capacitor package in a 7343 form factor surface mount device.

FIG. 23 depicts an embodiment of the capacitor device 94 in a surface mount device package, with line X-X representing the cross sectional cut line of either the device of either of FIG. 20 or FIG. 22. The packaged surface mount device 94 includes the anode terminal 65 and the cathode terminal 67, with the main body of the device 96 including the insulation layer 48 and the anode indication marking 63. Other device form factors such as embeddable/embedded devices mounted within the structure of a circuit board, as well as interposer devices are also possible. As is understood by those having ordinary skill in the art, interposer devices may be mounted within an active component package between an active device and an external electrical connection, or on the exterior of an active component package between the active device and the external electrical connection, and so on.

The embodiments of the present disclosure envision an active capacitor portion of a surface mount capacitor device being increased well beyond 5V % that is characteristic of current conductive polymer aluminum electrolytic capacitors. Accordingly, a capacitance exceeding 220 μF in a 7343-20 case with a rated voltage of 6.3 $V_{rated}$ are possible. More generally, the capacitance of any capacitor device fabricated in accordance with the embodiments of the present disclosure may exceed 3,500 $\mu F/cm^3$. As the lead structure is minimal in conductive length, and is fabricated from low resistivity materials such as aluminum, silver, and the like, the equivalent series resistance is low. Thus, ripple current capability may be improved.

Because of the carrier film 10 to support the aluminum sheet 12 during the fabrication process, the structural requirements for the aluminum sheet 12 may be significantly reduced. Therefore, etching or development of the accessible open pore surface area may be increased, as an inactive portion of the aluminum sheet 12 is no longer necessary. The inactive volume within the aluminum sheet 12 may be eliminated or at least minimized.

In comparison to conventional designs that require the handling and alignment of delicate etched and anodized foil leaves, the capacitor of the present disclosure achieves alignment at the array/sheet level, and the anode elements are supported by adhesion to the carrier film 10. Additionally, the foil may be further supported by the insulator within the alleys 46 during fabrication, so there is minimal risk of damage to the anode precursor structures 22. As described above, the individual capacitor units 76, 77 are fabricated in an array configuration. For example, in a 10 inch by 12 inch array and a 0.2 mm singulation kerf for each capacitor unit, the array may contain as many as 2,200 individual 7343-type devices. This arrayed approach to fabrication is simpler and less costly per individual device. Higher precision equipment may be used for mass manufacturing, further improving yield and manufacturing throughput all while reducing device-to-device variation and improving reliability while reducing cost.

The particulars shown herein are by way of example and for purposes of illustrative discussion of the embodiments of aluminum electrolytic capacitors and fabrication methods thereof and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A method for fabricating capacitors for a semiconductor device, comprising:

patterning an array of anode structures on a capacitor precursor laminate structure of a carrier and a metal layer adhered to the carrier;

etching the metal layer throughout substantially an entirety of a thickness of each of the anode structures of the array, an open accessible surface area of the metal layer being increased;

anodizing the open accessible surface area of the anode structures, an oxide layer being formed on the open accessible surface area of the metal layer to define anodes;

establishing cathode counter-electrodes on each of the anodes; and attaching input/output structures to the anodes and to the cathode counter-electrodes;

wherein given ones of the anodes, cathode counter-electrodes, and the input/output structures defining a capacitor unit, multiple ones of the capacitor unit defining a capacitor array.

2. The method of claim 1, wherein etching the metal layer of each of the anode structures of the array includes drilling holes of varying depths therein.

3. The method of claim 1, wherein establishing the cathode counter-electrodes on each of the anodes includes filling the open accessible surface area of the metal layer with a conductive polymer material.

4. The method of claim 1, further comprising stacking a plurality of capacitor arrays atop one another, a first one of the plurality of capacitor arrays being adhered to a second one of the plurality of capacitor arrays.

5. The method of claim 1, further comprising mating a first one of the plurality of capacitor arrays to a second one of the plurality of capacitor arrays.

6. The method of claim 1, further comprising removing the carrier layer from the metal layer.

7. The method of claim 1, further comprising singulating the capacitor units from the capacitor array.

8. A method for fabricating capacitors for a semiconductor device:

patterning an array of anode structures on a capacitor precursor laminate structure of a first carrier and an aluminum foil layer adhered to the first carrier, each of the anode structures being electrically interconnected and connected to a peripheral bus bar;

machining a plurality of holes into the aluminum foil layer of each of the anode structures;

etching the aluminum foil layer throughout substantially an entirety of its thickness to increase an open accessible surface area thereof while maintaining electrical conductivity;

anodizing the aluminum foil layers of the anode structures to define an oxide layer within the open accessible surface area thereof and form anodes corresponding to the anode structures;

filling the open accessible surface area of the anodes with a conductive polymer material to define cathode counter electrodes;

applying a conductive carbon layer to the cathode counter electrodes, the conductive carbon layer extending at least partially across respective ones of the cathode counter electrodes and defining conductive carbon segments;

applying a metallic conductor layer to the conductive carbon layer, the metallic conductor layer extending at least partially across respective ones of the conductive carbon layer and defining metallic conductor segments; and connecting the metallic conductor segments to respective ones of cathode lead frames.

9. The method of claim 8, further comprising:

filling areas around the anode structures with an insulating material;

wherein the conductive carbon layer extends across the insulating material.

10. The method of claim 8, further comprising removing the first carrier from the aluminum foil layer after filling the open accessible surface area of the anodes.

11. The method of claim 8, further comprising adhering a second carrier to a side opposite the first carrier.

12. The method of claim 11, further comprising:

singulating capacitor units defined at least by given ones of the anodes, the cathode counter electrodes, the conductive carbon segments, the metallic conductor segments, and the cathode lead frames; and fixing an anode terminal to the anode of a given one of the capacitor units, and a cathode terminal to the cathode lead frame of the given one of the capacitor units.

13. The method of claim 12, further comprising:

mating a first array of capacitor units to a second array of connected capacitor units, each of the capacitor units being defined at least by given ones of the anodes, the cathode counter electrodes, the conductive carbon segments, the metallic conductor segments, and the cathode lead frames, the first array of capacitor units being adhered to the second array of capacitor units;

singulating pairs of the mated capacitor units; and fixing an anode terminal to the anode of a given one of the capacitor units, and a cathode terminal to the cathode lead frame of the given one of the capacitor units.

14. A capacitor, comprising:

an anode having an accessible open pore surface area greater than 1.6 $m^2/cm^3$; and an anodized dielectric coating on the anode, an anodized accessible open pore surface area exceeding 1.5 $m^2/cm^3$.

15. The capacitor of claim 14, wherein capacitance exceeds 3,500 micro Farad per cubic centimeter.

16. The capacitor of claim 14, wherein the anode defines one or more holes.

17. The capacitor of claim 16, wherein one of the one or more holes is a through a hole extending from one exterior surface of the anode to another.

18. The capacitor of claim 16, wherein the one the one or more holes is a blind hole extending partially through the anode.

19. The capacitor of claim 14, further comprising a carrier to which the anode is adhered.

20. The capacitor of claim 14, wherein the anode is aluminum foil.

* * * * *